US010900917B2

(12) United States Patent
Yokoyama et al.

(10) Patent No.: US 10,900,917 B2
(45) Date of Patent: Jan. 26, 2021

(54) MEASURING DEVICE FOR COEFFICIENT OF THERMAL EXPANSION AND MEASUREMENT METHOD FOR COEFFICIENT OF THERMAL EXPANSION

(71) Applicant: MITUTOYO CORPORATION, Kawasaki (JP)

(72) Inventors: Yuichiro Yokoyama, Abiko (JP); Takeshi Hagino, Tsukuba (JP)

(73) Assignee: MITUTOYO CORPORATION, Kawasaki (JP)

( * ) Notice: Subject to any disclaimer, the term of this patent is extended or adjusted under 35 U.S.C. 154(b) by 183 days.

(21) Appl. No.: 16/040,946

(22) Filed: Jul. 20, 2018

(65) Prior Publication Data

US 2019/0064090 A1 Feb. 28, 2019

(30) Foreign Application Priority Data

Aug. 31, 2017 (JP) .................... 2017-167667

(51) Int. Cl.
*G01N 25/16* (2006.01)
(52) U.S. Cl.
CPC .................... *G01N 25/16* (2013.01)
(58) Field of Classification Search
CPC .................................................. G01N 25/16
See application file for complete search history.

(56) References Cited

U.S. PATENT DOCUMENTS

2014/0157861 A1\* 6/2014 Jonas ............... G01B 5/008
73/1.79
2016/0211112 A1\* 7/2016 Nakao ............... H01J 37/226

FOREIGN PATENT DOCUMENTS

JP 3897655 B2 3/2007

\* cited by examiner

*Primary Examiner* — Stephen D Meier
*Assistant Examiner* — Nasir U. Ahmed
(74) *Attorney, Agent, or Firm* — Oliff PLC

(57) ABSTRACT

A coefficient-of-thermal-expansion measuring device includes temperature control device, optical interferometer, and control device including: an actual data acquiring unit sequentially changing an object's temperature and acquiring actual data measured by the optical interferometer at each temperature; a data set generating unit generating pieces of verification data by setting an order of interference of the actual data within a predetermined range, selecting one piece of verification data at each temperature, and generating data sets each containing the selected piece of verification data at each temperature; and a judging unit deriving approximation functions with different orders from each data set, determining an evaluation index value based on differences of verification data from each approximation function, selecting a candidate data set with the smallest evaluation index value for each approximation function, and determining whether the candidate data set is the same for each approximation function to judge applicability of the candidate data set.

8 Claims, 19 Drawing Sheets

FIG. 4

| DATA SET NO. | TEMPERATURE | | | | | | | |
|---|---|---|---|---|---|---|---|---|
| | | $20-\Delta t$ | $20-\Delta t \times 2/3$ | $20-\Delta t \times 1/3$ | $20$ | $20+\Delta t \times 1/3$ | $20+\Delta t \times 2/3$ | $20+\Delta t$ |
| 1 | LENGTH | $L1-3(\lambda/2)$ | $L2-3(\lambda/2)$ | $L3-3(\lambda/2)$ | $L4-3(\lambda/2)$ | $L5-3(\lambda/2)$ | $L6-3(\lambda/2)$ | $L7-3(\lambda/2)$ |
| 2 | | $L1-3(\lambda/2)$ | $L2-3(\lambda/2)$ | $L3-3(\lambda/2)$ | $L4-3(\lambda/2)$ | $L5-3(\lambda/2)$ | $L6-3(\lambda/2)$ | $L7-2(\lambda/2)$ |
| . | | . | . | . | . | . | . | . |
| . | | . | . | . | . | . | . | . |
| . | | . | . | . | . | . | . | . |
| 411764 | | $L1-(\lambda/2)$ | $L2-(\lambda/2)$ | L3 | L4 | L5 | L6 | L7 |
| 411765 | | L1 | L2 | L3 | L4 | L5 | L6 | $L7-(\lambda/2)$ |
| 411766 | | L1 | L2 | L3 | L4 | L5 | $L6-(\lambda/2)$ | L7 |
| 411767 | | L1 | L2 | L3 | L4 | L5 | L6 | L7 |
| 411768 | | L1 | L2 | L3 | L4 | $L5-(\lambda/2)$ | L6 | L7 |
| 411769 | | L1 | L2 | $L3-(\lambda/2)$ | L4 | L5 | L6 | L7 |
| 411770 | | L1 | L2 | L3 | L4 | L5 | L6 | L7 |
| 411771 | | $L1-(\lambda/2)$ | L2 | L3 | L4 | L5 | L6 | L7 |
| 411772 | | L1 | L2 | L3 | L4 | L5 | L6 | L7 |
| 411773 | | $L1+(\lambda/2)$ | L2 | L3 | L4 | L5 | L6 | L7 |
| 411774 | | L1 | $L2+(\lambda/2)$ | L3 | L4 | L5 | L6 | L7 |
| 411775 | | L1 | L2 | $L3+(\lambda/2)$ | L4 | L5 | L6 | L7 |
| 411776 | | L1 | L2 | L3 | $L4+(\lambda/2)$ | L5 | L6 | L7 |
| 411777 | | L1 | L2 | L3 | L4 | $L5+(\lambda/2)$ | L6 | L7 |
| 411778 | | L1 | L2 | L3 | L4 | L5 | $L6+(\lambda/2)$ | L7 |
| 411779 | | L1 | $L2+(\lambda/2)$ | L3 | L4 | L5 | L6 | $L7+(\lambda/2)$ |
| 411780 | | $L1+(\lambda/2)$ | L2 | L3 | L4 | L5 | L6 | L7 |
| . | | . | . | . | . | . | . | . |
| . | | . | . | . | . | . | . | . |
| . | | . | . | . | . | . | . | . |
| 823542 | | $L1+3(\lambda/2)$ | $L2+3(\lambda/2)$ | $L3+3(\lambda/2)$ | $L4+3(\lambda/2)$ | $L5+3(\lambda/2)$ | $L6+3(\lambda/2)$ | $L7+2(\lambda/2)$ |
| 823543 | | $L1+3(\lambda/2)$ | $L2+3(\lambda/2)$ | $L3+3(\lambda/2)$ | $L4+3(\lambda/2)$ | $L5+3(\lambda/2)$ | $L6+3(\lambda/2)$ | $L7+3(\lambda/2)$ |

MEASURING DEVICE FOR COEFFICIENT OF THERMAL EXPANSION AND MEASUREMENT METHOD FOR COEFFICIENT OF THERMAL EXPANSION

The entire disclosure of Japanese Patent Application No. 2017-167667 filed Aug. 31, 2017 is expressly incorporated by reference herein.

TECHNICAL FIELD

The present invention relates to a measuring device for a coefficient of thermal expansion (hereinafter referred to as "CTE measuring device") and a measurement method for a coefficient of thermal expansion (hereinafter referred to as "CTE measurement method").

BACKGROUND ART

A CTE measuring device configured to accurately measure the coefficient of thermal expansion (hereinafter occasionally abbreviated as "CTE") of a substance has been known (for instance, see Patent Literature 1: Japanese Patent No. 3897655).

A CTE α can be calculated by the following formula (1), in which L represents a length of an object at a standard temperature, ΔT represents a temperature variation from the standard temperature (a temperature at measurement—standard temperature), and ΔL represents a variation in length (thermal expansion) as a result of changing the temperature of the object from the standard temperature by ΔT.

$$\alpha = \frac{\Delta L}{L} \cdot \frac{1}{\Delta T} \quad (1)$$

In the formula (1), ΔL/L is a value in $10^{-5}$ order, so that the accuracy of ΔL is important to enhance the accuracy of a value of ΔL/L. To highly accurately calculate the CTE α, the temperature variation ΔT and the thermal expansion ΔL need to be accurately measured. The temperature variation ΔT can be calculated with a sufficient accuracy using an industrial high-precision thermometer.

Meanwhile, the thermal expansion ΔL can be measured, for instance, using an optical interferometer such as Michelson interferometer and Twyman-Green interferometer. In the use of such an optical interferometer, the thermal expansion ΔL is indirectly calculated based on the pieces of absolute dimension measurement data of the object independently obtained by a plurality of times of measurement as disclosed in, for instance, Patent Literature 1.

In measuring the absolute dimension using the optical interferometer, the length of the object is calculated by the following formula (2).

$$L = \frac{\lambda}{2}(N + \varepsilon) \quad (2)$$

In the formula (2), N represents an order of interference (integer) and ε represents a fraction. An actually measurable value using the optical interferometer is only the fraction ε and thus the actually measurable value is a half wavelength of measurement light or less. Meanwhile, the order of interference N is estimated from a preliminary value of the dimension. Thus, if the order of interference N is incorrectly determined, the value will be offset in the integral multiples of a half wavelength.

To calculate the CTE, measurement of the temperature and the length is repeated for a plurality of times with changes in the temperature of the object and a linear approximation function is derived from the measurement results. The CTE is obtained from the gradient of the function. Hereinbelow, each measurement of the temperature and the length provides a single piece of measurement data (temperature and length), and a set of data obtained by repeating the measurement for a plurality of times with changes in the temperature of the object is referred to as an actual data set.

FIG. 18 shows an exemplary actual data set obtained when the orders of interference N are correct. FIG. 19 shows an exemplary actual data set obtained when the orders of interference N are partly incorrectly determined.

The examples shown in FIGS. 18 and 19 are each an actual data set obtained by measurement performed at seven temperatures in a range of 20±Δt degrees C. As shown in FIG. 18, when the orders of interference N are correct, the linear approximation function derived from each data is consistent with a normal relationship between the temperature and length of the object. The CTE α can be obtained by the formula (1), where a gradient (ΔL/ΔT) of the linear approximation function is divided by a length L of the object.

In contrast, FIG. 19 shows the example where the order of interference N is set smaller than the actual value in measuring the length at a temperature of 20-Δt degrees C. and larger than the actual value in measuring the length at a temperature of 20+Δt degrees C. Referring to the example shown in FIG. 19, the CTE α is calculated to be larger than the actual value as a result of incorrectly setting the orders of interference N.

The above-described order of interference N is estimated from a preliminary measurement value obtained by preliminarily measuring the dimension of the object using an optical interferometer. When the optical interferometer uses a single-wavelength light source, the preliminary measurement value needs to have an accuracy equal to or less than the half wavelength with respect to the true value of the dimension of the object. For instance, in the use of a laser beam with a wavelength of 633 nm, the preliminary measurement value needs to have an accuracy in an acceptable range of approximately 300 nm or less with respect to the true value of the dimension of the object. Such a required accuracy is so difficult to achieve that the order of interference N is highly likely to be incorrectly determined.

Accordingly, a coincidence method using light sources with a plurality of wavelengths is sometimes used to expand the acceptable range of the preliminary value. For instance, with the use of a light source configured to emit a laser beam with a wavelength of 633 nm and a light source configured to emit a laser beam with a wavelength of 543 nm, the acceptable range can be expanded up to 1.9 μm with respect to the true value of the dimension of the object. However, the above method requires a light source for each of a plurality of wavelengths of light. In other words, a plurality of light sources need to be prepared with increased costs and, further, periodic maintenance, such as wavelength calibration, needs to be performed on the plurality of light sources with increased maintenance costs.

Moreover, if one of the light sources malfunctions but an alternative device cannot be readily prepared, measurement needs to be performed only using a single-wavelength light.

In this case, the order of interference N is highly likely to be incorrectly determined as described above. Otherwise, to enhance the measurement accuracy, the measurement needs to be suspended until the alternative device is prepared.

SUMMARY OF THE INVENTION

In view of the above problems, an object of the invention is to provide a CTE measuring device and a CTE measurement method that allow for continuous highly accurate measurement.

According to an aspect of the invention, a coefficient-of-thermal-expansion measuring device includes: a temperature detector configured to detect a temperature of an object; an optical interferometer configured to measure a length of the object using a single-wavelength light; an actual data acquiring unit configured to: sequentially change the temperature of the object to temperatures Ti in a range of i=1 to k; and acquire actual data Li of the length of the object measured by the optical interferometer at each of the temperatures Ti; a data set generating unit configured to: generate a plurality of pieces of verification data Di for the actual data Li at each of the temperatures Ti by setting an order of interference within a predetermined range; select one of the pieces of verification data Di at each of the temperatures Ti in the range of i=1 to k; and generate a plurality of data sets each containing the selected piece of verification data Di at each of the temperatures Ti, the plurality of data sets having different combinations of selection of the pieces of verification data Di; and a judging unit configured to: derive a plurality of approximation functions with different orders from each of the plurality of data sets; determine an evaluation index value based on respective differences of the pieces of verification data Di in each of data sets from each of the approximation functions; select, as a candidate data set, a first data set with the smallest evaluation index value among the plurality of data sets for each of the approximation functions; and determine whether the candidate data set is the same for each of the approximation functions to judge applicability of the candidate data set.

In the above aspect, a plurality of pieces of verification data Di for the actual data Li at each of temperatures Ti are generated by setting (changing) the order of interference within the predetermined range, and the plurality of data sets each containing one selected from the pieces of verification data Di at each of the temperatures Ti are generated. The number of the data sets corresponds to the total number of the combinations of the selected pieces of verification data Di. Further, the plurality of approximation functions (e.g., linear approximation function and quadratic approximation function) with different orders are derived from each of the data sets, and the candidate data set is selected for each of the approximation functions, the candidate data set having the smallest evaluation index value based on the respective differences (residual errors) of the pieces of verification data Di in each of the data sets from each of the approximation functions. Subsequently, it is determined whether the candidate data set is the same for each of the approximation functions.

In the above aspect, by comparing the evaluation index value based on the difference between the verification data Di and each of the approximation functions, it can be determined whether the actual data Li matches the true value. Further, it can be determined which one of the data sets contains the verification data Di close to the true value and is suitable for measurement (calculation) of the coefficient of thermal expansion (CTE).

For instance, if the orders of interference of some pieces of actual data Li are incorrectly determined, the data set containing the pieces of verification data Di based on such pieces of actual data Li provides a large difference between some pieces of verification data Di and each of the approximation functions. In contrast, if a verification data set group (generated data sets) includes a data set having a smaller evaluation index value, which means a difference from each of the approximation functions is smaller (i.e., the pieces of verification data Di in this data set achieve a relationship shown in FIG. 18), the length measured at each of the temperatures Ti is highly likely to be correct. Accordingly, in the above aspect, the evaluation index value of each of the data sets is calculated to determine whether the actual data Li matches the true value of the length of the object at each of the temperatures Ti, thereby enhancing the reliability of the CTE measurement.

Further, the most suitable one of the data sets for calculating the CTE can be selected from the verification data set group, so that the CTE can be calculated based on the selected data set with high accuracy. In other words, the CTE can be corrected if the actual data Li has an error due to the order of interference being incorrectly determined.

Further, the above arrangement can improve the measurement accuracy of CTE irrespective of the use of the optical interferometer not including a plurality of light sources (i.e., unreliable in determining the order of interference N). Additionally, the above arrangement eliminates the necessity of the use of a plurality of light sources, thus reducing the device costs. Further, since maintenance is required only for a single light source, the maintenance costs can also be reduced.

The relationship between temperature and thermal expansion is sometimes approximated by not a linear approximation function but a polynomial approximation function with two or more orders depending on the nature of the object. For such an object, the evaluation index value is increased due to the respective residual errors of the pieces of verification data Di from the linear approximation function, although the actual data would be ideal without any error in the order of interference and measurement error.

Accordingly, each of the data sets may be approximated by a polynomial approximation function with two or more orders to evaluate the residual errors of the pieces of verification data Di from the approximation function. However, the actual data Li contains variations, so that the residual errors are not necessarily reduced by approximating each of the data sets by the polynomial approximation function with two or more orders as compared with if each of the data sets were approximated by a linear approximation function.

Such variations in the actual data Li may accompany a change in the refractive index of air due to, for instance, air fluctuation in an optical path of the optical interferometer. For such variations due to a change in measurement conditions, the data may be corrected by measuring temperature, atmospheric pressure, humidity, and carbon dioxide concentration and calculating the refractive index of air. However, these parameters may change even during the measurement. Meanwhile, the optical interferometer may be installed in a vacuum pump or a vacuum chamber to maintain the measurement conditions but, in this case, increased device size and increased device costs are inevitable.

Accordingly, in the above aspect, the judging unit derives the plurality of approximation functions with different orders from each of the data sets, and selects the candidate data set with the smallest evaluation index value for each of the approximation functions. Further, the judging unit determines whether the selected candidate data set is the same for each of the approximation functions.

When the pieces of verification data Di in the data set are correct, the data set is ranked first and selected as the candidate data set with the smallest evaluation index value for each of the approximation functions (irrespective of approximating method). If the candidate data set is different depending on approximating method, the data set contains the incorrect verification data Di and thus is unsuitable for calculating the CTE.

In the above aspect, it is determined whether the candidate data set based on the evaluation index value for each of the approximation functions is the same as described above. Thus, it can be determined whether the candidate data set is suitable for calculating the correct CTE, thereby obtaining a highly accurate CTE. Further, devices such as a vacuum pump and a vacuum chamber may be omitted, thus preventing an increase in device size and reducing device costs.

In the above aspect, it is preferable that the coefficient-of-thermal-expansion measuring device further includes a coefficient-of-thermal-expansion calculator configured to calculate a coefficient of thermal expansion based on each of the plurality of data sets, in which the judging unit is configured to exclude any of the data sets that provides the coefficient of thermal expansion out of a predetermined first acceptable range.

In the above aspect, when the CTE of the object is substantially known, a CTE acceptable range (first acceptable range) is determined in advance and any data set providing the CTE out of this range is excluded. This prevents any data set that will provide an unreasonable CTE from becoming the candidate, thus allowing promptly and stably judging the applicability of the data set, that is, selecting the data set suitable for calculating the CTE.

In the above aspect, it is preferable that the evaluation index value is a representative value of the respective differences of the pieces of verification data Di in each of the data sets from each of the approximation functions, and the judging unit is configured to judge the applicability of the first data set with the smallest evaluation index value.

In the above aspect, the judging unit calculates, as the evaluation index value, the representative value of the differences (residual errors) of the pieces of verification data in each of the data sets from each of the approximation functions. The representative value may be a maximum value, an average value, or a root mean square. In this case, a small evaluation index value means that the values of the verification data are close to each of the approximation functions, that is, the length of the object at each temperature is close to the true value and thus the order of interference is highly unlikely to be incorrect. Accordingly, by judging the applicability of the data set having the smallest evaluation index value, the data set suitable for calculating the CTE can be selected.

In the above aspect, it is preferable that the judging unit is configured to determine whether the smallest evaluation index value of the first data set falls within a predetermined second acceptable range.

When the evaluation index value is out of the second acceptable range, the actual data is highly likely to be incorrect for the true value of the length of the object even when the evaluation index value is the smallest. Accordingly, in the above aspect, it is determined whether the evaluation index value falls within the second acceptable range. This prevents the CTE from being calculated based on the incorrect data.

In the above aspect, the judging unit may be configured to determine whether a difference between the smallest evaluation index value of the first data set and a second smallest evaluation index value of a second data set among the data sets is at least a predetermined value.

When the first data set with the smallest evaluation index value is compared with the second data set with the second smallest evaluation index value to find that a difference between these evaluation index values is small, it is difficult to determine which one of the first data set and the second data set is correct. Accordingly, in the above aspect, it is determined whether the difference between the evaluation index values of the first data set and the second data set is at least the predetermined value to prevent the CTE from being calculated based on the incorrect data.

In the above aspect, it is preferable that the coefficient-of-thermal-expansion measuring device further includes an order range acquiring unit configured to acquire the range of the order of interference, in which the data set generating unit is configured to generate the verification data Di by setting the order of interference within the range of the order of interference acquired by the order range acquiring unit.

In the above aspect, the order of interference is increased or reduced within the range acquired by the order range acquiring unit to generate the pieces of verification data. In other words, the user can set a variation range of the order of interference as desired. The number of the data sets in the verification data set group is increased by increasing the variation range of the order of interference and reduced by reducing the variation range. Thus, if the CTE measurement needs to be performed soon or the CTE of the object is substantially known, the variation range of the order of interference may be reduced. In contrast, if the CTE of the object is not available (e.g., unknown), the variation range of the order of interference may be increased, thus allowing highly accurate measurement of the CTE even when the gradient $\Delta L/\Delta T$ is large.

In the above aspect, it is preferable that the actual data Li includes actual data Lf at a predetermined temperature Tf, and the data set generating unit is configured to calculate verification data Df for the actual data Lf by fixing the order of interference of the actual data Lf and to calculate the verification data Di for the rest of the actual data Li by setting the order of interference within the predetermined range.

In the above-described CTE measuring device, if a data set contains the piece of verification data Di with the order of interference that is increased (or reduced) from that of the piece of actual data Li at each of the temperatures Ti by the same increment, the data set is substantially translated in parallel. Thus, a plurality of data sets with the same gradient ($\Delta L/\Delta T$) are generated. These data sets have the same evaluation index value (residual error) and thus provide the same CTE, so that two or more of the data sets may be ranked the same when the data sets are ranked in ascending order of the evaluation index values thereof. However, the presence of such data sets with the same rank is disadvantageous for identifying the data set suitable for calculating the accurate CTE and, additionally, leads to an increase in a load on an arithmetic operation.

Accordingly, in the above aspect, the verification data Di is generated by fixing the order of interference of actual data Lf at a certain temperature (regular temperature Tf) among the plurality of temperatures Ti and setting the orders of interference of the pieces of actual data Li at the other temperatures within the above range. In other words, the verification data Df at the regular temperature Tf always matches the actual data Lf in all the data sets. This can prevent the above-described generation of the data sets having the same evaluation index value.

In the above aspect, it is preferable that the actual data acquiring unit is configured to acquire the actual data Li resulting from changing temperature variations of the temperature of the object at irregular intervals.

The temperature may be changed at regular intervals. However, in this case, a specific variation pattern of the orders of interference may result in generation of the data sets having the same evaluation index value. For instance, a data set with the unchanged order of interference may have the same evaluation index value as another data set with the orders of interference being increased in increments of 1, although the data set with the unchanged order of interference is greatly different in CTE from the data set with the increased orders of interference. Accordingly, in the above aspect, the temperature is changed at irregular intervals so that different evaluation index values can be calculated even when the orders of interference have a specific variation pattern as described above, thus allowing accurate selection of the data set suitable for calculating the CTE.

According to another aspect of the invention, a coefficient-of-thermal-expansion measurement method for measuring a coefficient of thermal expansion of an object includes: sequentially changing a temperature of the object to temperatures Ti in a range of i=1 to k; acquiring actual data Li of a length of the object measured at each of the temperatures Ti using an optical interferometer configured to emit a single-wavelength light; generating a plurality of pieces of verification data Di for the actual data Li at each of the temperatures Ti by setting an order of interference within a predetermined range; selecting one of the pieces of verification data Di at each of the temperatures Ti in the range of i=1 to k; generating a plurality of data sets each containing the selected piece of verification data Di at each of the temperatures Ti, the plurality of data sets having different combinations of selection of the pieces of verification data Di; deriving a plurality of approximation functions with different orders from each of the plurality of data sets; determining an evaluation index value based on respective differences of the pieces of verification data Di in each of the data sets from each of the approximation functions; selecting a candidate data set with the smallest evaluation index value among the plurality of data sets for each of the approximation functions; and determining whether the candidate data set is the same for each of the approximation functions to judge applicability of the candidate data set.

In this aspect, it can be determined whether the actual data Li matches the true value of the object in the same manner as in the above aspect. Further, a candidate for the data set for calculating the CTE can be selected from the verification data set group, so that the CTE can be corrected if the order of interference of the actual data Li has an error.

The above aspect can also improve the measurement accuracy of the CTE in the use of an optical interferometer not including a plurality of light sources (i.e., unreliable in determining the order of interference N). Additionally, the above aspect eliminates the necessity of the use of a plurality of light sources. Thus, since maintenance is only required for a single light source, the device costs and maintenance costs can be reduced.

Further, even if the actual data contains variations, it can be determined whether the candidate data set is correct without the necessity of measuring a large variety of parameters for measurement conditions and/or using a device such as a vacuum chamber.

BRIEF DESCRIPTION OF DRAWING(S)

FIG. 1 schematically shows an arrangement of a CTE measuring device according to a first exemplary embodiment.

FIG. 2 schematically shows an example of a temperature control device according to the first exemplary embodiment.

FIG. 4 shows an exemplary verification data set group according to the first exemplary embodiment.

DESCRIPTION OF EMBODIMENT(S)

First Exemplary Embodiment

Description is made below on a CTE measuring device according to a first exemplary embodiment of the invention.

Figure 1:
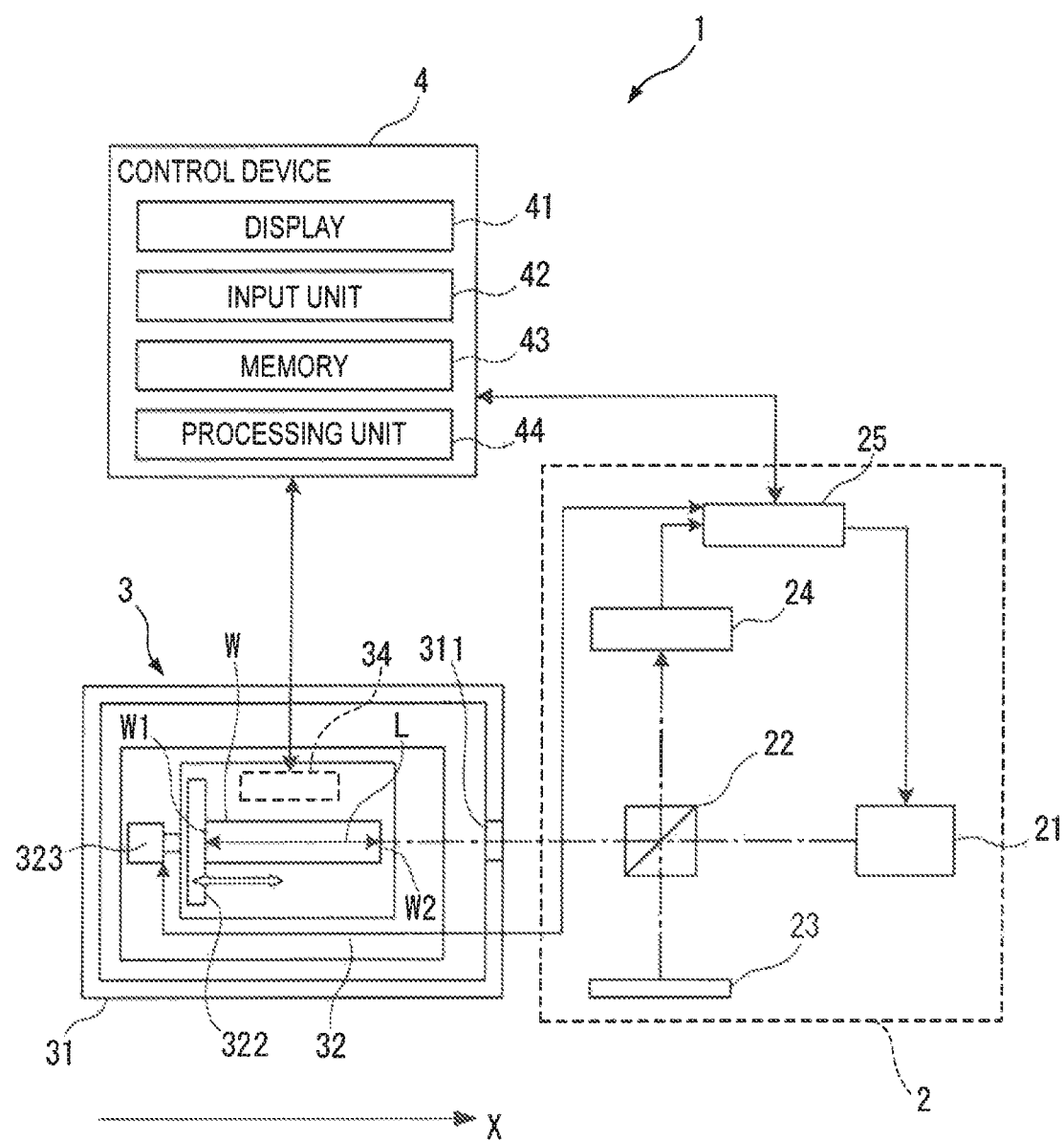

FIG. 1 schematically shows an arrangement of a CTE measuring device 1 according to the first exemplary embodiment.

As shown in FIG. 1, the CTE measuring device 1 includes an optical interferometer 2, a temperature control device 3, and a control device 4.

Arrangement of Temperature Control Device 3

Figure 2:
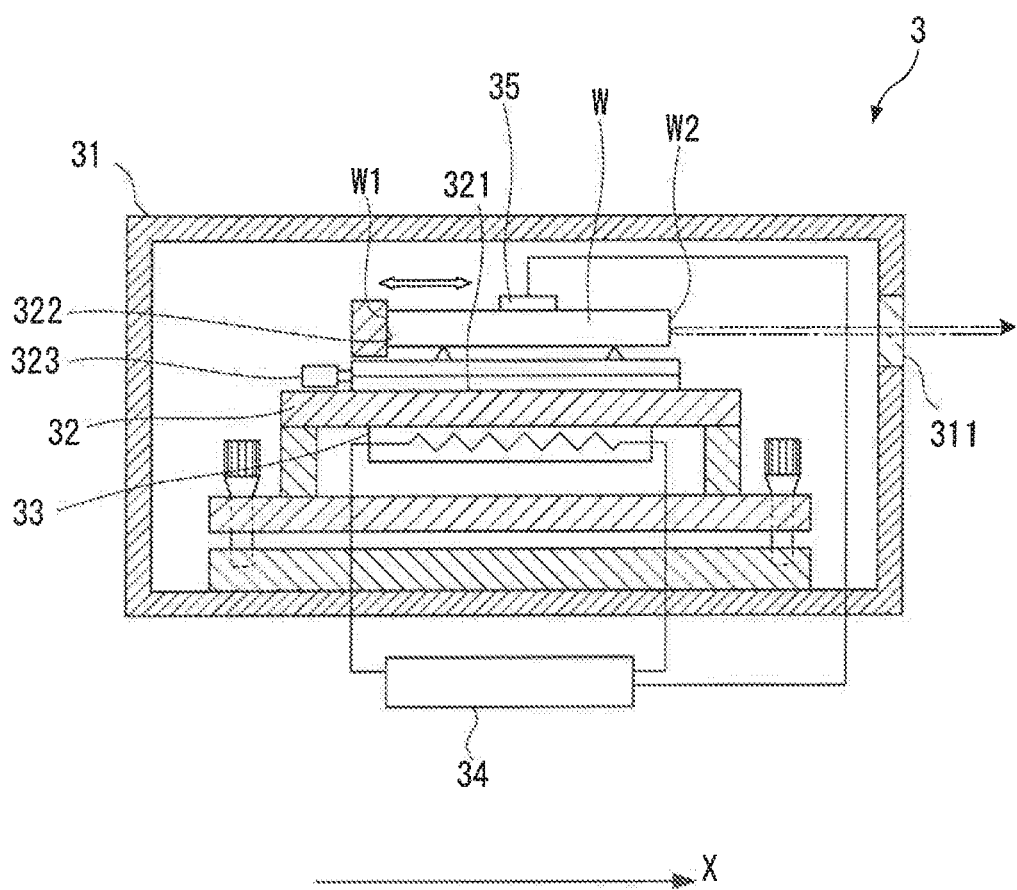

FIG. 2 schematically shows an example of the temperature control device 3.

The temperature control device 3, which corresponds to a temperature detector according to the invention, includes a variable temperature chamber 31 for accommodating an object W as shown in FIG. 2. The variable temperature chamber 31 includes walls made of a heat insulating material or an heat insulating layer. A table 32, which is made of a soaking plate, is installed in the variable temperature chamber 31, The table 32 has, for instance, a planar upper surface (mounting surface 321) on which the object W is to be mounted.

The table 32 also has a reference flat surface 322 that is perpendicular to the mounting surface 321 and to a traveling direction (X axis) of light emitted from the optical interferometer 2. The object W is mounted on the table 32 such that a lower surface of the object W is supported at an Airy point or a Bessel point by, for instance, a beam on the mounting surface 321 and a first end surface W1 of the object W in a length measuring direction is in close contact with the reference flat surface 322.

The reference flat surface 322 is movable in the X-axis direction. A motion control mechanism 323 is provided to the table 32 to move the reference flat surface 322 and detect a displacement thereof. The motion control mechanism 323, which is connected to the optical interferometer 2, is configured to output the detected displacement to the optical interferometer 2.

The variable temperature chamber 31 is provided with a window 311, through which a laser beam enters, at a position opposite the reference flat surface 322. The window 311 is made of, for instance, glass and a laser beam from the optical interferometer 2 passes therethrough.

The table 32 is also provided with a heater 33 and a temperature controller 34 connected to the heater 33. Further, a temperature sensor 35 is attached to the object W on the table 32 and the temperature sensor 35 is connected to the temperature controller 34.

Thus, the temperature of the object W is detected by the temperature sensor 35 and the heater 33 is driven by the temperature controller 34 to heat the object W so that the temperature of the object W reaches a desired temperature.

Further, the temperature controller 34, which is connected to the control device 4, is configured to output the temperature of the object W detected by the temperature sensor 35 to the control device 4.

Arrangement of Optical Interferometer 2

As shown in FIG. 1, the optical interferometer 2 includes a laser source 21, a beam splitter 22, a reflective mirror 23, a receiver unit 24, and a measurement controller 25.

The laser source 21 is configured to emit a laser beam with a single wavelength $\lambda$. The laser source 21 may be a wavelength-stabilized He—Ne laser source capable of emitting a laser beam with $\lambda$=633 nm.

The beam splitter 22 is configured to split the laser beam from the laser source 21 into a measurement light directed to a second end surface W2 of the object W and a reference light directed to the reflective mirror 23. The beam splitter 22 is also configured to synthesize the measurement light reflected on the second end surface W2 of the object W and the reference light reflected on the reflective mirror 23 into an interference light. Further, the beam splitter 22 is configured to split the laser beam from the laser source 21 into a measurement light directed to the reference flat surface 322, which is held in close contact with the first end surface W1 of the object W, and a reference light directed to the reflective mirror 23. The beam splitter 22 is also configured to synthesize the measurement light reflected on the reference flat surface 322 and the reference light reflected on the reflective mirror 23 into an interference light.

The reflective mirror 23 is aligned with, for instance, a direction perpendicular to a direction toward the object W. A distance between the reflective mirror 23 and the beam splitter 22 may be changeable so that interference fringes are phase-shifted for measurement.

The receiver unit 24 is configured to receive the interference light synthesized by the beam splitter 22 and output a signal corresponding to the light intensity to the measurement controller 25.

The measurement controller 25, which is connected to the laser source 21, the receiver unit 24, and the motion control mechanism 323, is configured to, for instance, control the emission of the laser beam from the laser source 21, estimate a preliminary measurement value, and perform length measurement based on the light-receiving signal from the receiver unit 24.

The measurement controller 25 is configured to measure a length L (actual data Li=$(\lambda/2)\times(N+\varepsilon)$) of the object W using the formula (2) and output the measured value to the control device 4.

As described above, a value measured by the optical interferometer 2 based on the signal from the receiver unit 24 is a value of the fraction E.

The order of interference N is estimated by performing preliminary measurement. For instance, the reference flat surface 322 is moved to a position corresponding to each of the first end surface W1 and the second end surface W2 of the object W by the motion control mechanism 323 to cause interference of white light. Preliminary measurement is then performed using a distance (displacement) between the first end surface W1 and the second end surface W2 as a preliminary measurement value L" of the object W. Subsequently, the measurement controller 25 divides the preliminary measurement value L" by $\lambda/2$ to obtain an integer part, thus estimating the order of interference N.

The measurement controller 25 determines the length of the object W by the formula (2) using the order of interference N estimated by the above-described preliminary measurement and the fraction c obtained by measuring the object W, and outputs the determined length as the actual data Li to the control device 4.

Arrangement of Control Device 4

The control device 4, which may be a computer such as a personal computer, includes a display 41, an input unit 42, a memory 43, and a processing unit 44 as shown in FIG. 1.

The display 41 is configured to display, for instance, measurement results.

The input unit 42, which may be any input device such as a mouse and a keyboard, is configured to output an operation signal corresponding to an input operation by a user to the processing unit 44.

The memory 43 stores a variety of data for controlling the CTE measuring device 1 and a variety of programs.

Figure 3:
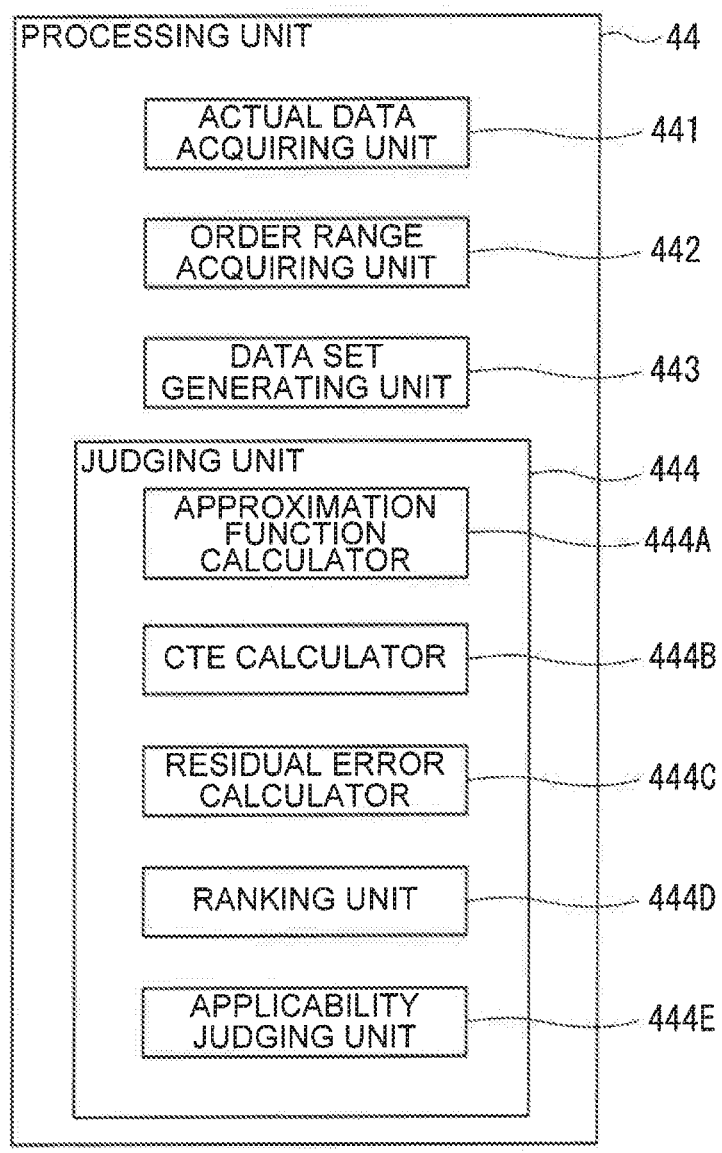
FIG. 3 is a block diagram showing functional components of a processing unit according to the first exemplary embodiment.

FIG. 3 is a block diagram showing functional components of the processing unit 44.

The processing unit 44, which includes an arithmetic circuit such as a central processing unit (CPU) and a storing circuit, is configured to perform a variety of processes by reading the variety of programs stored in the memory 43 and running these programs. Specifically, as shown in FIG. 3, the processing unit 44 functions as, for instance, an actual data acquiring unit 441, an order range acquiring unit 442, a data set generating unit 443, and a judging unit 444 in conjunction with the variety of programs.

The actual data acquiring unit 441 is configured to acquire temperatures Ti of the object W inputted from the temperature control device 3 (temperature controller 34) and the length (actual data Li) of the object W at each of the temperatures Ti inputted from the optical interferometer 2. In this exemplary embodiment, the temperatures Ti (i=1 to k) for measurement are sequentially changed and the length (actual data Li) of the object W is measured at each of the temperatures Ti, thus obtaining the actual data Li at each of the temperatures Ti. Thus-obtained pieces of actual data Li are referred to as an actual data set.

The order range acquiring unit 442 is configured to obtain a variation range of the order of interference for generating later-described verification data Di based on the operation signal from the input unit 42.

The data set generating unit 443 is configured to generate the verification data Di for each of the pieces of actual data Li in the actual data set by increasing or reducing the order of interference N in the formula (2).

The variation range of the order of interference N can be determined as desired by a user using the input unit 42. When the order range acquiring unit 442 does not acquire the range of the order of interference N, the order of interference is increased or reduced within a predetermined range.

For instance, when the order of interference varies in a range of ±n, the order of interference N in the formula (2) is increased or reduced to be set at an order of interference N' (N'=N−n, N−(n−1), N−(n−2) . . . N, . . . N+(n−2), N+(n−1), N+n), thus calculating pieces of verification data Di. In this case, the number of the pieces of verification data Di generated for the piece of actual data Li at each of the temperatures Ti is m=2n+1.

Here, the verification data Di is calculated by the following formula (3).

$$Di = \frac{\lambda}{2}(N' + \varepsilon) = \frac{\lambda}{2}(N \pm n + \varepsilon) = \frac{\lambda}{2}(N + \varepsilon) \pm \frac{\lambda}{2}n = L \pm \frac{\lambda}{2}n \quad (3)$$

The data set generating unit 443 can thus easily generate the pieces of verification data by increasing or reducing each of the pieces of actual data Li in increments or decrements of a half wavelength.

The data set generating unit 443 is also configured to generate a verification data set by changing combination of the generated pieces of verification data Di. Specifically, in measuring the actual data Li at each of the temperatures Ti in a range of i=1 to k, the number of the obtained pieces of actual data Li is k and the number of the obtained pieces of verification data for the piece of actual data Li at each of the temperatures Ti is m, so that the total number j of the data sets with different combinations is represented by j=k$^m$. A group of these data sets is hereinafter referred to as a verification data set group.

FIG. 4 shows an exemplary verification data set group. In the example shown in FIG. 4, the temperature of the object W is changed to each of seven values (k=7) and the order of interference is increased or reduced from the original order N in a range of ±3 (n=3). Thus, seven pieces of verification data Di are obtained for each piece of actual data Li and the total number j of the data sets with different combinations is j=7$^7$=823543.

The judging unit 444 includes an approximation function calculator 444A, a CTE calculator 444B (coefficient-of-thermal-expansion calculator), a residual error calculator 444C, a ranking unit 444D, and an applicability judging unit 444E.

The approximation function calculator 444A is configured to derive an approximation function(s) from the verification data Di in each of the verification data sets. In this exemplary embodiment, two approximation functions such as a linear approximation function and a quadratic approximation function are derived from each of the data sets but the invention is not limited thereto. For instance, two approximation functions such as a quadratic approximation function and a cubic approximation function may be derived or, alternatively, three approximation functions such as a linear approximation function, a quadratic approximation function and a cubic approximation function may be derived.

The CTE calculator 444B is configured to calculate a CTE α based on the above-described formula (1) by dividing a gradient (ΔL/ΔT) of the linear approximation function by the length L (actual data Li) of the object W. Here, the CTE α is exemplarily calculated from the linear approximation function but may be calculated from the quadratic approximation function. In the latter case, the CTE α may be calculated from a gradient (ΔL/ΔT) of a tangent of the quadratic approximation function at the reference temperature (e.g., 20 degrees C.). Similarly, the CTE α may be calculated from a gradient (ΔL/ΔT) of a tangent of a polynomial approximation function, such as a cubic approximation function, at the reference temperature (e.g., 20 degrees C.).

The residual error calculator 444C is configured to calculate residual errors between each of the approximation functions and the pieces of verification data Di and calculate a representative value (evaluation index value) of the residual errors.

The residual errors may be calculated based on the difference of the approximation function from the pieces of verification data Di or the differences of the pieces of verification data Di from the approximation function.

Figure 5:
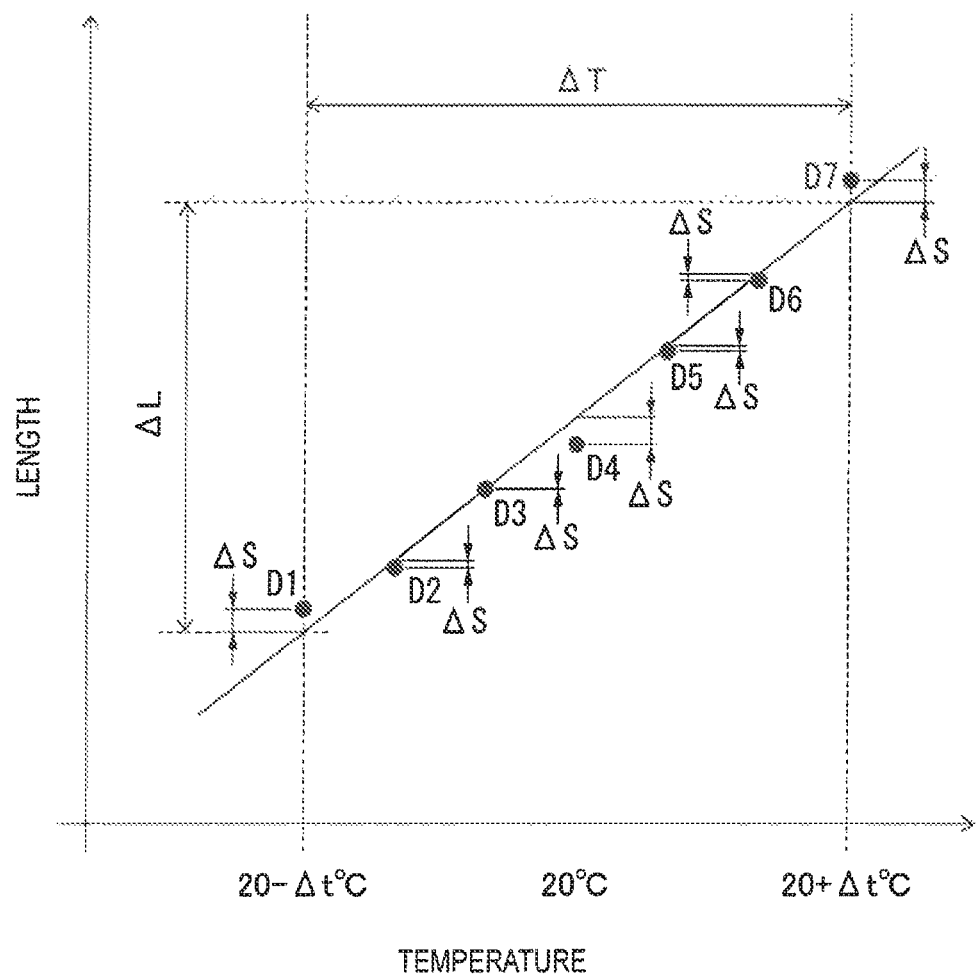
FIG. 5 is an illustration for explaining calculation of residual errors between a linear approximation function and verification data.
Figure 6:
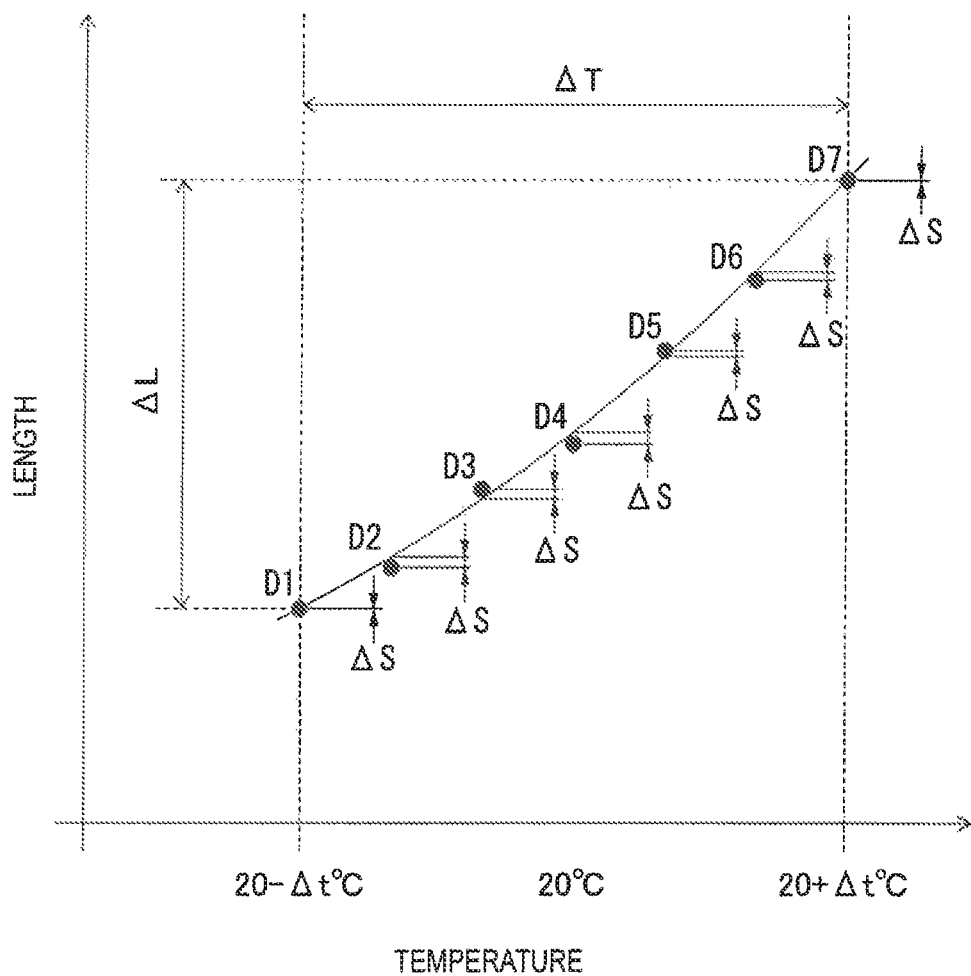
FIG. 6 is an illustration for explaining calculation of residual errors between a quadratic approximation function and the verification data.

FIG. 5 is an illustration for explaining calculation of the residual errors between the linear approximation function and verification data Di according to this exemplary embodiment. FIG. 6 is an illustration for explaining calculation of the residual errors between the quadratic approximation function and the verification data Di.

According to this exemplary embodiment, the residual error calculator 444C calculates the respective differences (residual errors Δs) of the pieces of verification data Di for the temperatures Ti from the linear approximation function as shown in FIG. 5. Further, the residual error calculator 444C calculates the respective differences (residual errors Δs) of the pieces of verification data Di for the temperatures Ti from the quadratic approximation function as shown in FIG. 6.

The residual error calculator 444C then uses the representative value of these residual errors Δs as an evaluation index value s. The evaluation index value s is calculated for each of the approximation functions. Here, the representative value of the residual errors Δs calculated with respect to the linear approximation function is referred to as a first evaluation index value s1 and the representative value of the residual errors Δs calculated with respect to the quadratic approximation function is referred to as a second evaluation index value s2.

The representative value of the residual errors Δs used as the evaluation index value s may be the largest one of the respective absolute values of the residual errors Δs or may be an average value or a root mean square of the residual errors Δs or of the respective absolute values of the residual errors Δs.

The ranking unit 444D is configured to rank the data sets in ascending order of the evaluation index values s and determine the data set with the smallest evaluation index value s as a first candidate data set. Additionally, if the calculated CTE α is out of a predetermined first acceptable range, the ranking unit 444D excludes the data set corresponding to the CTE α out of the predetermined first acceptable range from the data sets being ranked.

The applicability judging unit 444E is configured to judge the applicability of the first candidate data set. Specifically, by selecting the CTE α corresponding to the first candidate data set, which has the smallest evaluation index value s, the CTE α can be corrected even if the order of interference N is incorrectly determined. However, variations and errors attributed to factors different from the order of interference N sometimes simultaneously occur. In such a case, the data set with the smallest evaluation index value s does not necessarily correspond to the correct CTE α.

Accordingly, the applicability judging unit 444E determines, for instance, whether the evaluation index value s of the first candidate data set falls within a predetermined second acceptable range, thus judging the applicability of the first candidate data set.

CTE Measurement Method

Figure 7:
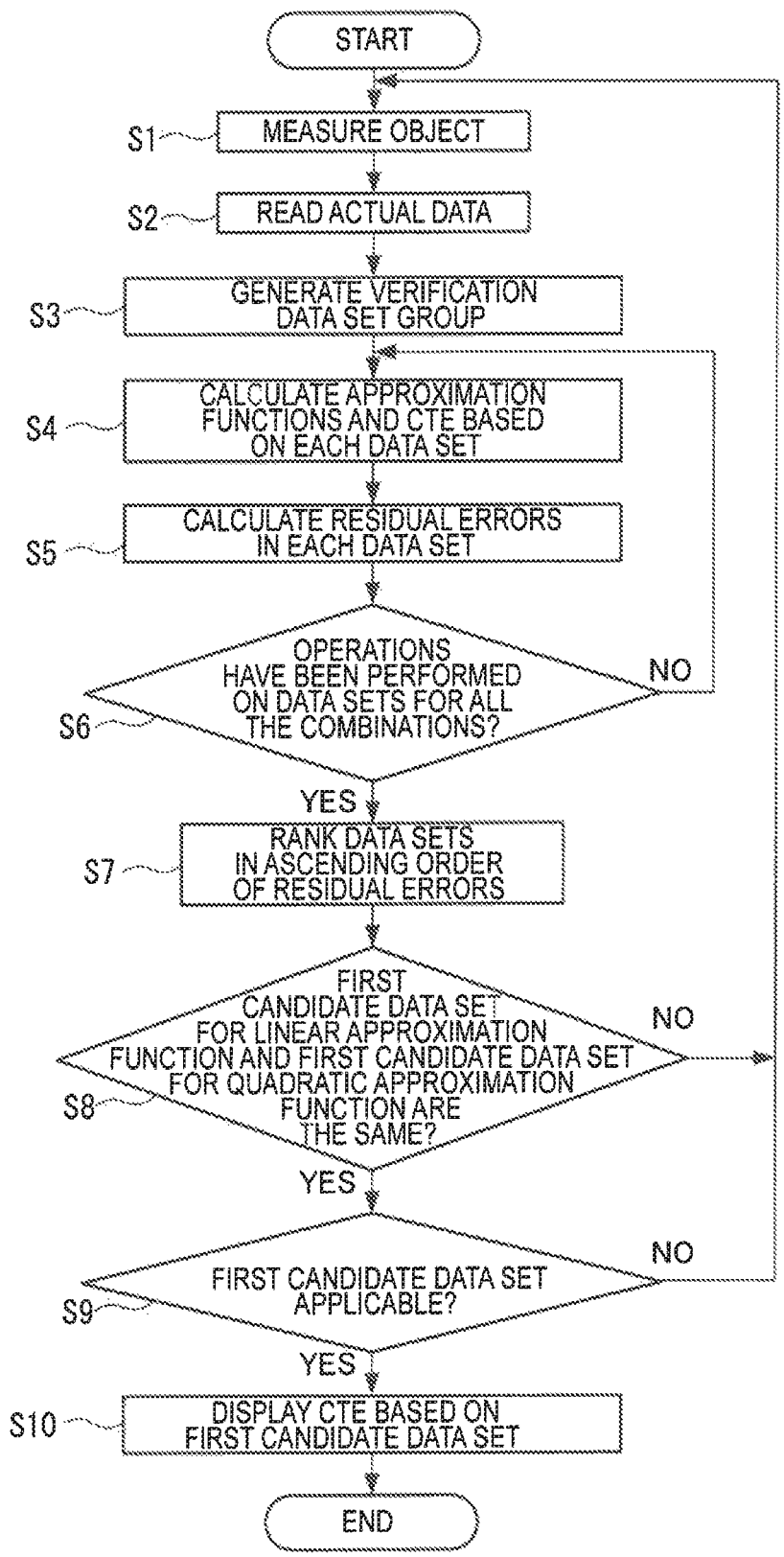
FIG. 7 is a flowchart showing a CTE measurement method according to the first exemplary embodiment.

Next, description is made on a CTE measurement method according to this exemplary embodiment. FIG. 7 is a flowchart showing the CTE measurement method.

In measuring the CTE of the object W, it is assumed that the order of interference N for the length of the object W is determined in advance by preliminary measurement. For instance, the reference flat surface 322 is moved by a displacement corresponding to the length of the object W and an integer part obtained by dividing the displacement by the half wavelength of the laser beam is taken as the order of interference N as described above.

In measuring the object W, the temperature control device 3 first sequentially changes the temperature of the object W to the temperatures Ti and, simultaneously, the optical interferometer 2 measures the actual data Li of the object W at each of the temperatures Ti. The obtained actual data Li is stored in the memory 43 (Step S1).

Next, the actual data acquiring unit 441 reads sequential pieces of actual data Li (i=1 to k) stored in the memory 43 (Step S2).

With reference to the read actual data Li, the data set generating unit 443 generates pieces of verification data Di by setting (changing) the order of interference N within a predetermined range (±n). Further, the data set generating unit 443 generates a verification data set group including data sets each containing one selected from the generated pieces of verification data Di at each of the temperatures Ti, the number of the data sets corresponding to the total number of the combinations of the selected pieces of verification data Di (Step S3).

Subsequently, the approximation function calculator 444A of the judging unit 444 derives a linear approximation function and a quadratic approximation function from each of the data sets and the CTE calculator 444B calculates the CTE α based on each of the data sets using the formula (1) (Step S4). The CTE α may be calculated from the gradient of the tangent of the quadratic approximation function at the reference temperature as described above.

Further, the residual error calculator 444C calculates the respective residual errors Δs of the pieces of verification data Di contained in each of the data sets with respect to each of the approximation functions and determines the representative value of the residual errors as the evaluation index value s of the data set (Step S5). In Step S5, as described above, the respective residual errors Δs of the pieces of verification data Di with respect to the linear approximation function and the respective residual errors Δs of the pieces of verification data Di with respect to the quadratic approximation function are calculated to determine the first evaluation index value s1 for the linear approximation function and the second evaluation index value s2 for the quadratic approximation function.

The judging unit 444 determines whether the operations of Step S4 and Step S5 have been performed on the data sets for all the combinations (Step S6). When the determination result is No (the operations have not been completed), the process returns to Step S4.

When the determination result is Yes in Step S6, the ranking unit 444D ranks the data sets (Step S7).

Incidentally, any of the data sets with the CTE α, which is calculated in Step S4, out of the first acceptable range is excluded from the data sets being ranked. When the CTE α of the object W is a substantially known value, the first acceptable range is defined as a predetermined range around the substantially known value of the CTE α and can be increased or reduced depending on, for instance, a material of the object W. The first acceptable range may be inputted by a user using the input unit 42 and may be stored in the memory 43 in advance. If an approximate value of the CTE α of the object W is not available (e.g., unknown), the data sets may be ranked without excluding any of the data sets.

In Step S7, the data set with the smallest evaluation index value s (the representative value of the residual errors Δs) is selected (picked out) as the first candidate data set. Specifically, the candidate data set is selected for each of the approximation functions. For instance, according to this exemplary embodiment, each of the data sets has the evaluation index value s1 determined for the linear approximation function and the evaluation index value s2 determined for the quadratic approximation function. Thus, the ranking unit 444D selects the first candidate data set with the evaluation index value s1 as a first candidate data set for linear approximation and the first candidate data set with the evaluation index value s2 as a first candidate data set for quadratic approximation.

Subsequently, the applicability judging unit 444E determines whether the first candidate data set for linear approximation and the first candidate data set for quadratic approximation are the same (Step S8).

Figure 8:
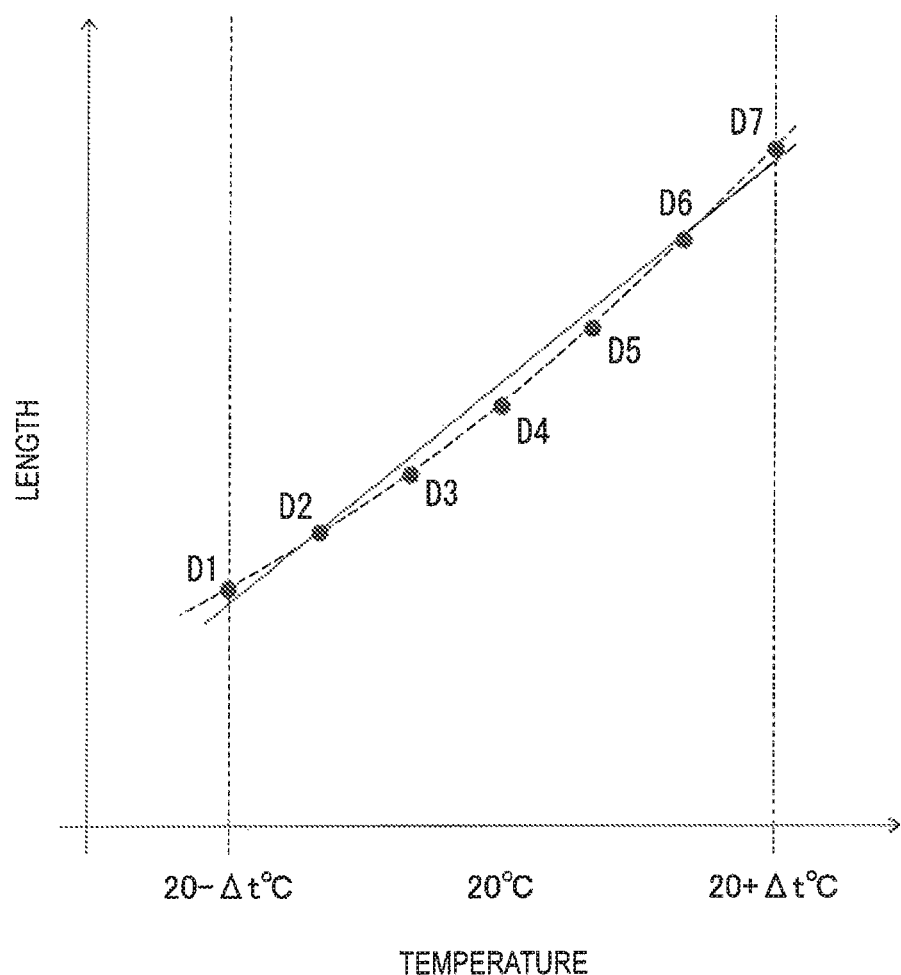
FIG. 8 shows exemplary linear approximation function and quadratic approximation function derived from an actual data set A.
Figure 9:
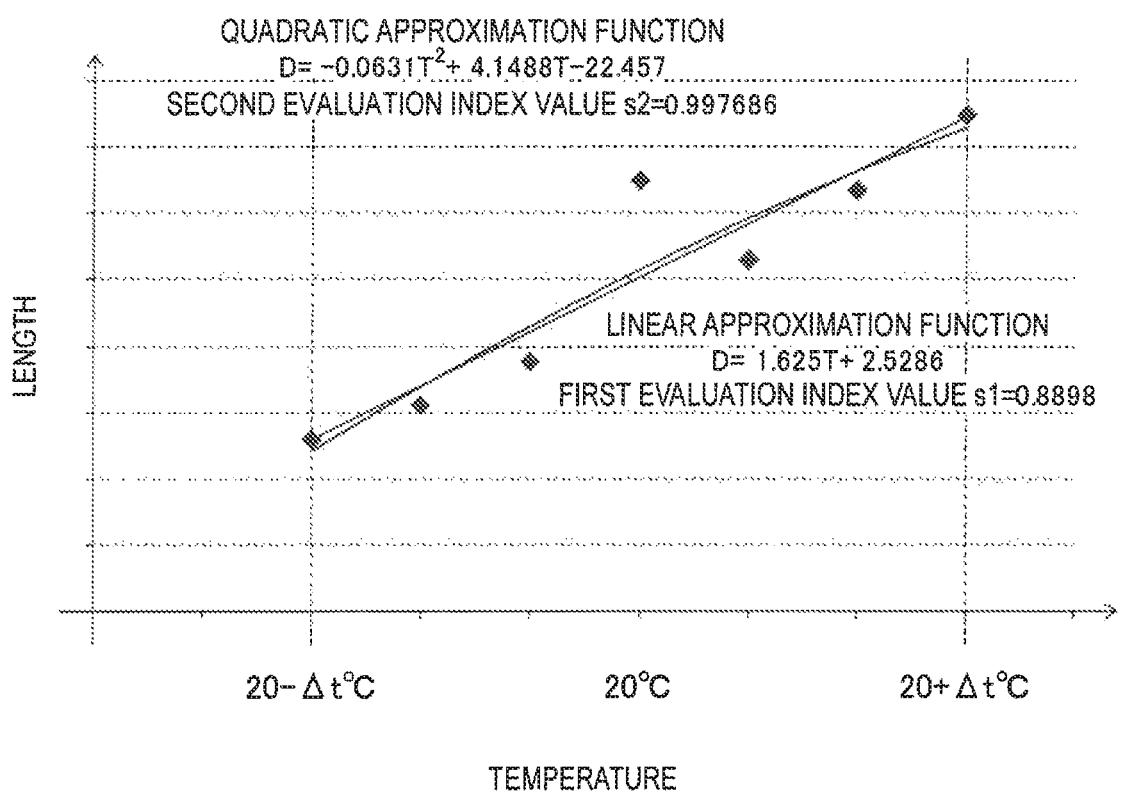
FIG. 9 shows exemplary linear approximation function and quadratic approximation function derived from another actual data set B.

FIG. 8 shows exemplary linear approximation function and quadratic approximation function derived from an actual data set A. FIG. 9 shows exemplary linear approximation function and quadratic approximation function derived from another actual data set B.

For instance, the actual data set A shown in FIG. 8 contains the pieces of actual data Li without variation depending on measurement conditions. In this case, the residual errors Δs with respect to the quadratic approximation function tend to be smaller than the residual errors Δs with respect to the linear approximation function. However, the actual measurement is accompanied by variations depending on, for instance, a change in the measurement conditions as described above. For instance, the actual data set B shown in FIG. 9 contains the pieces of actual data Li with variations depending on measurement conditions. In this case, when the average value of the residual errors Δs is used as the evaluation index value s, the first evaluation index value s1 for the linear approximation function is s1=0.8898 and the second evaluation index value s2 is s2=0.9976857, so that s1<s2.

When the first candidate data set for linear approximation is different from the first candidate data set for quadratic approximation, it is difficult to determine which one of the data sets is correct. This is because, in comparison between the first evaluation index value s1 and the second evaluation index value s2, the second evaluation index value s2 is not necessarily associated with an approximation function that should have been derived from the pieces of verification data Di as described above.

Accordingly, when the determination result is No in Step S8, the process returns to Step S1 to remeasure the length of the object W according to this exemplary embodiment.

In contrast, when the determination result is Yes in Step S8, the applicability judging unit 444E judges the applicability of the first candidate data set (Step S9).

The applicability judging unit 444E determines, for instance, whether the evaluation index value s (the first evaluation index value s1 and the second evaluation index value s2) of the first candidate data set falls within the predetermined second acceptable range. The second acceptable range, which can be set as desired depending on, for instance, the accuracy of the CTE α as required, may be inputted by a user using the input unit 42. In this case, when the evaluation index value s falls within the second acceptable range, the first candidate data set is determined to be applicable as being suitable as a data set for calculating the CTE α.

Alternatively, it may be determined whether a difference in evaluation index value s between the first candidate data set with the smallest evaluation index value s and a second candidate data set with the second smallest evaluation index value s is at least a predetermined value.

In other words, if the difference between the evaluation index values s of the first candidate data set and the second candidate data set, which has the second smallest evaluation index value, is small, the second candidate data set would be data corresponding to the accurate CTE α depending on coincidences of variations and errors attributed to other factors. Accordingly, when the difference between the evaluation index values of the first candidate data set and the second candidate data set is at least the predetermined value, the first candidate data set is determined to be applicable.

In this exemplary embodiment, it is only required to determine whether one of a difference between the evaluation index values s of the first candidate data set and the second candidate data set for linear approximation and a difference between the evaluation index values s of the first candidate data set and the second candidate data set for quadratic approximation is at least the predetermined value. However, it may be determined whether each of the difference between the evaluation index values s of the first candidate data set and the second candidate data set for linear approximation and the difference between the evaluation index values s of the first candidate data set and the second candidate data set for quadratic approximation is at least the predetermined value.

The applicability may be judged by determining whether the evaluation index value s falls within the second acceptable range as described above and, additionally, by determining whether the difference between the evaluation index values s of the first candidate data set and the second candidate data set is at least the predetermined value as described above.

When the determination result is No in Step S9 (i.e., the evaluation index value s is out of the second acceptable range and/or the difference from the evaluation index value s of the second candidate data set is less than the predetermined value), the process returns to Step S1. In other words, when the determination result is No in Step S9, the CTE α calculated based on the first candidate data set is highly likely to contain an error. Accordingly, in this case, the actual data Li is preferably remeasured.

In contrast, when the determination result is Yes in Step S9, the CTE α calculated based on the first candidate data set is considered as the CTE α of the object W. In this case, for instance, the display 41 shows the CTE α based on the first candidate data set as the result of the CTE measurement (Step S10). In this exemplary embodiment, the CTE α is exemplarily calculated with reference to the linear approximation function but may be calculated from the gradient of the tangent of the quadratic approximation function at the reference temperature as described above.

Thus, even if the order of interference N is incorrectly determined in the actual data, the above-described process of this exemplary embodiment corrects the CTE α based on the actual data to the CTE α based on the first candidate data set, thus allowing highly accurate measurement of the CTE α.

Advantage(s) of Exemplary Embodiment(s)

In this exemplary embodiment, the temperature control device 3 sequentially changes the temperature of the object W to the temperatures Ti and the temperature sensor 35 detects each of the temperatures Ti of the object W. The optical interferometer 2 measures the length (actual data Li) of the object W at each of the temperatures Ti. The data set generating unit 443 of the control device 4 generates the plurality of pieces of verification data Di by setting the order of interference N of the actual data Li at each of the temperatures Ti within the predetermined range (±n), and generates the plurality of data sets each containing one selected from the pieces of verification data Di at each of the temperatures Ti, the number of the data sets corresponding to the total number of the combinations of the selected pieces of verification data Di. Subsequently, the judging unit 444 derives a plurality of approximation functions with different orders from the pieces of verification data Di contained in each of the data sets and, further, calculates, as the evaluation index value s, the representative value of the respective residual errors Δs of the pieces of verification data Di with respect to each of the approximation functions. The judging unit 444 then selects the first candidate data set with the smallest evaluation index value s for each of the plurality of approximation functions and determines whether the first candidate data set is the same for each of the approximation functions.

By such judgment of the applicability based on the evaluation index value s, for instance, it can be determined whether the measured actual data Li is correct for the true value of the length of the object W with reference to the verification data Di generated from the actual data Li. Further, if the order of interference N is incorrectly determined in the actual data Li, a data set with a smaller evaluation index value s among other data sets, if any, can be selected as the first candidate data set. Thus, even if the actual data Li is incorrect, the CTE α can be accurately calculated based on the pieces of verification data Di in the first candidate data set. In other words, the optical interferometer 2 is allowed to measure the CTE α with high accuracy, although the optical interferometer 2 includes only a single-wavelength light source (i.e., unreliable in determining the order of interference N) instead of a plurality of light sources.

Further, the use of the optical interferometer 2, which does not include a plurality of light sources, leads to a reduction in, for instance, device costs and maintenance costs.

When the first candidate data set with the smallest evaluation index value s is different depending on approximation function, it is difficult to determine which one of the data sets is correct. Accordingly, in such a case, the length of the object W is remeasured according to this exemplary embodiment. When the first candidate data set with the smallest evaluation index value s is the same for each of the approximation functions, the CTE α is calculated based on the pieces of verification data Di in the first candidate data set. This allows for highly accurately calculating the CTE even when the actual data Li has variations due to a change in the measurement conditions. Further, any device (e.g., vacuum pump and vacuum chamber) for preventing a change in the measurement conditions can be omitted, thus simplifying the device configuration and reducing device costs.

In this exemplary embodiment, the judging unit 444 calculates the CTE α based on each of the data sets in the verification data set group and excludes the data set(s) providing the CTE α out of the first acceptable range.

Specifically, when the CTE α of the object W is substantially known, the first acceptable range is defined around the known CTE α in advance and any data set providing the CTE α out of this range is excluded. This prevents any data set providing an unreasonable CTE α from becoming the candidate. Thus, the applicability of the data set can be promptly and stably judged so that the correct CTE α is promptly calculated.

In this exemplary embodiment, the judging unit 444 determines whether the evaluation index value s of the first candidate data set falls within the second acceptable range, and determines the first candidate data set to be suitable for calculation of the CTE α when the evaluation index value s falls within the second acceptable range. In contrast, when the evaluation index value s is out of the second acceptable range, the actual data Li is remeasured.

If the evaluation index value s of the first candidate data set is out of the second acceptable range, it means that there is a large difference between the approximation function and the verification data Di. Thus, the correct actual data Li is highly unlikely to be obtained. In this case, the CTE α calculated based on the first candidate data set is less likely to be correct. Accordingly, in this exemplary embodiment, the actual data Li is remeasured in such a case. This prevents the CTE α with low accuracy from being calculated.

In this exemplary embodiment, the judging unit 444 requests remeasurement of the actual data Li if a difference between the evaluation index value s of the first candidate data set and the evaluation index value s of the second candidate data set is less than the predetermined value. Specifically, if the evaluation index value s of the first candidate data set is close to that of the second candidate data set, the rank of the second candidate data set, which is actually correct, may be switched with that of the first candidate data set since the evaluation index value s of the second candidate data set is lowered by some other error factors and the like. In this case, the incorrect CTE α is likely to be calculated. Accordingly, in this exemplary embodiment, the actual data Li is remeasured in such a case. This prevents the CTE α with low accuracy from being calculated.

In this exemplary embodiment, the control device 4 includes the order range acquiring unit 442 that obtains the range of the order of interference. Thus, a user can set the order of interference N within a desired range to generate the verification data Di.

Second Exemplary Embodiment

Next, a second exemplary embodiment of the invention is described.

Figure 10:
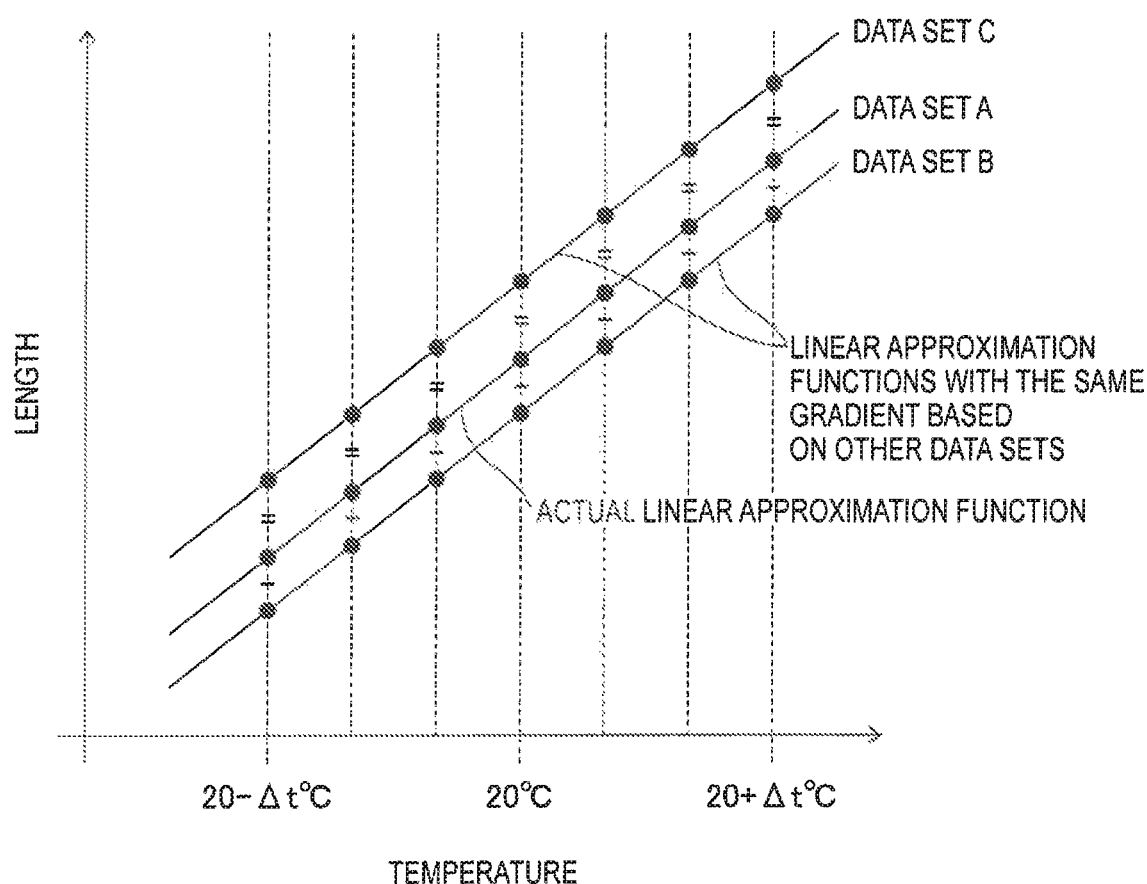
FIG. 10 shows an example of data sets that are the same in evaluation index value and CTE.

In the first exemplary embodiment, some data sets among the plurality of data sets are the same in evaluation index value s or CTE. FIG. 10 shows an example of the data sets that are the same in evaluation index value s and CTE.

Specifically, as shown in FIG. 10, a data set B and a data set C are translated in parallel to a data set A, the data set B containing pieces of verification data with the respective orders of interference that are reduced from those of the data set A by the same number (e.g., 1), the data set C containing the pieces of verification data with the respective orders of interference that are increased from those of the data set A by the same number (e.g., 1). The respective linear approximation functions of these data sets B, C are the same in gradient (ΔL/ΔT) as that of the data set A, while being different only in intercept. Thus, the CTE α and the evaluation index value s calculated based on each of the data sets B, C are the same as those of the data set A.

However, since the judging unit 444 ranks the data sets in ascending order of the evaluation index values s, the presence of the data sets that are ranked the same disadvantageously makes the process for identifying the correct data set unstable and, additionally, increases a load on an arithmetic operation.

Accordingly, to prevent generation of the data sets that are the same in evaluation index value s and/or CTE, the second exemplary embodiment is differentiated in the process of the data set generating unit 443 from the first exemplary embodiment.

The like reference characters are used hereinbelow to refer to the above-described parts, which are not explained again.

Figure 11:
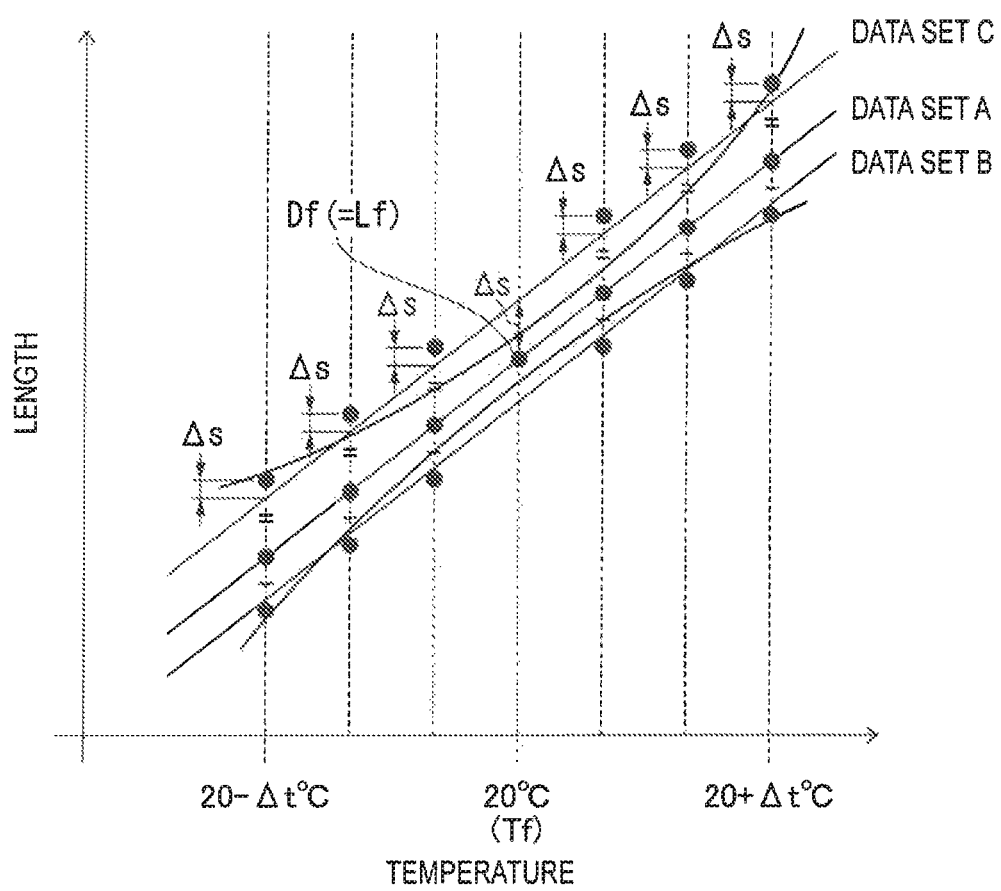
FIG. 11 shows an example of data sets according to a second exemplary embodiment.

FIG. 11 shows an example of data sets according to the second exemplary embodiment.

In this exemplary embodiment, the data set generating unit 443 does not generate verification data Df with the increased or reduced orders of interference N for actual data Lf obtained at a specific temperature (hereinafter referred to as "regular temperature Tf") in Step S3. In other words, only a single piece of verification data Df corresponding to actual data Lf (order of interference N) is used for the actual data Lf.

In the example of FIG. 11, the regular temperature Tf is set at 20 degrees C. According to the first exemplary embodiment, the data sets A, B, C are generated that are the same in gradient (ΔL/ΔT), CTE α, and evaluation index value s as shown in FIG. 10. In contrast, according to the second exemplary embodiment, all the data sets have a single piece of verification data Df at the regular temperature Tf as shown in FIG. 11. Thus, the data sets A, B, C have different evaluation index values s while being the same in gradient. In the example of FIG. 11, the evaluation index value s of each of the data sets B, C for either the linear approximation function or the quadratic approximation function is greater than that of the data set A.

Thus, in the process of the ranking unit 444D for selecting the first candidate data set, the data sets B, C are not ranked the same as the data set A.

This prevents some data sets from being selected as the first candidate data set, thus stabilizing the process and preventing an increased load on an arithmetic operation.

Third Exemplary Embodiment

Next, a third exemplary embodiment of the invention is described.

In the first exemplary embodiment and the second exemplary embodiment, temperature intervals ΔTi (temperature variations) between temperatures for obtaining the actual data Li are exemplarily regular intervals. However, in such as a case, some data sets may be substantially the same in evaluation index value s while being different in CTE α.

Figure 12:
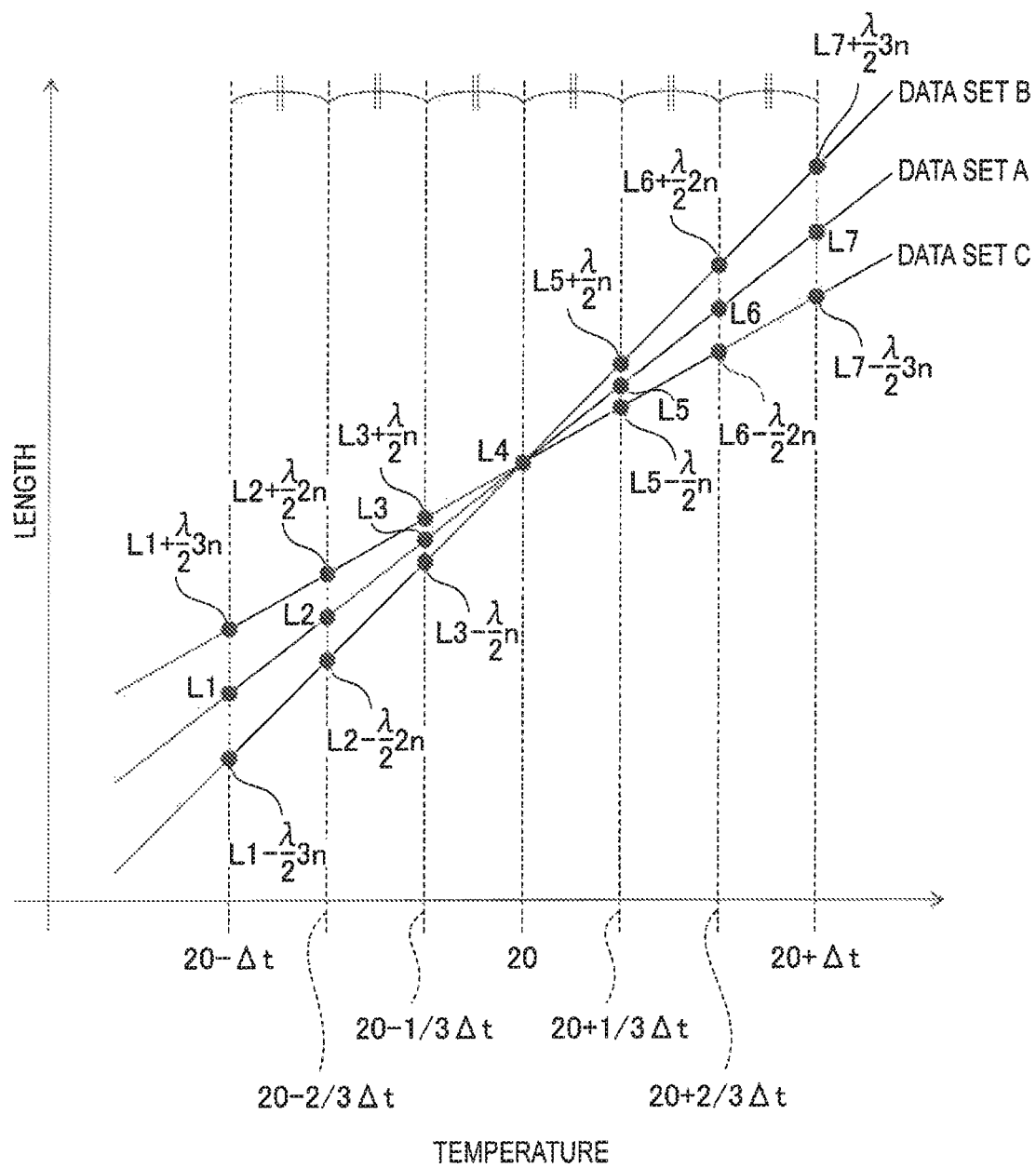
FIG. 12 shows an example of data sets that are different in CTE but substantially the same in evaluation index value.

FIG. 12 shows an example of data sets that are different in CTE but substantially the same in evaluation index value s.

Specifically, as represented by the formula (3), each of the pieces of verification data Di is a value obtained by adding/subtracting an integral multiple of the half wavelength to/from the actual data Li. Thus, if the data sets A, B, C include specific data sets in which one piece of verification data is the same and other pieces of verification data Di have the incremented or decremented orders of interference N, some of the data sets may be substantially the same in evaluation index value s.

For instance, an example shown in FIG. 12 is explained where the actual data Li is measured while the temperature is changed seven times in a range from 20−Δt degrees C. to 20+Δt degrees C. at regular intervals. It is assumed that the order of interference N has no error at each of these seven points and the data set A based on the actual data Li provides the correct CTE α.

Here, the data set B contains verification data D4 (=L4) with the same order of interference as that of the data set A at 20 degrees C. In a part of the data set B at temperatures higher than 20 degrees C., the pieces of verification data Di (D5=L5+n×λ/2, D6=L6+2n×λ/2, D7=L7+3n×λ/2) are selected such that the order of interference N is increased by +1, +2 and +3 in this order (in increments of 1) as the temperature is away from 20 degrees C. Similarly, in a part at temperatures lower than 20 degrees C., the pieces of verification data Di (D3=L3−n×λ/2, D2=L2−2n×λ2, D1=L1−3n×λ/2) are selected such that the order of interference N is decreased by −1, −2 and −3 in this order (in decrements of 1) as the temperature is away from 20 degrees C. The data set C contains, contrary to the data set B, the verification data with the order of interference N that is decreased in decrements of 1 at temperatures higher than 20 degrees C. and increased in increments of 1 at temperatures lower than 20 degrees C.

Figure 13:
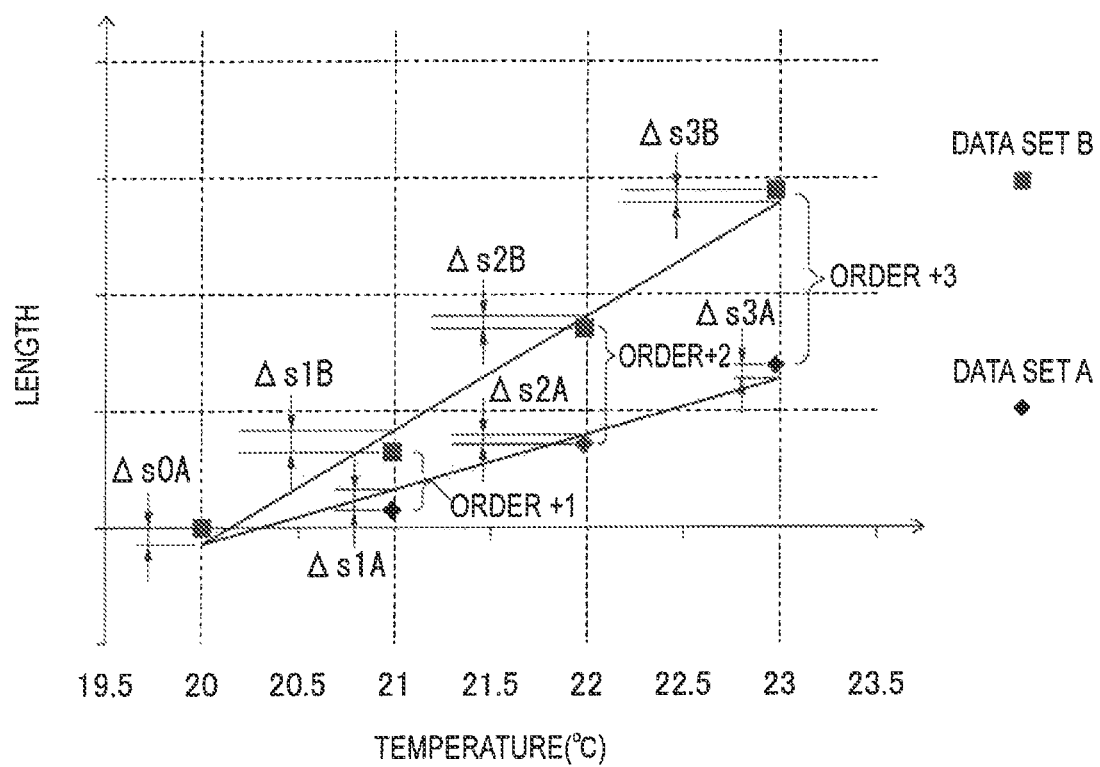
FIG. 13 shows the verification data and the linear approximation function of each of data sets A, B in FIG. 12 on an enlarged scale.
Figure 14:
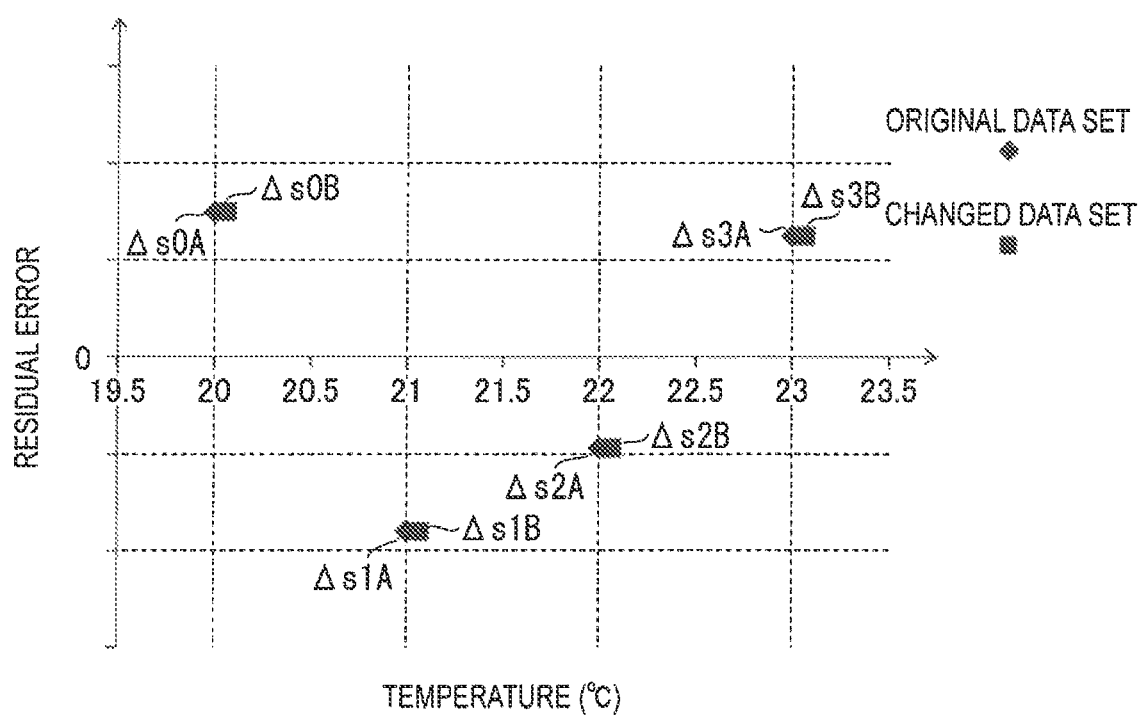
FIG. 14 shows residual errors in the data sets A, B in FIG. 12.

FIG. 13 shows the verification data Di and the linear approximation function of each of the data sets A, B in FIG. 12 on an enlarged scale. FIG. 14 shows the residual errors Δs in the data sets A, B in FIG. 12.

The gradient (ΔL/ΔT) of the linear approximation function of the data set B is different from that of data set A as shown in FIG. 13, so that the CTE α calculated based on the data set B is also different. However, as shown in FIGS. 13 and 14, the residual errors Δs of the data set B are substantially the same as those of the data set A. Thus, in the process of the ranking unit 444D for selecting the first candidate data set, the data set B or C may be ranked the same as the data set A. In such a case, the correct CTE cannot be identified.

Accordingly, in the third exemplary embodiment, the temperature intervals ΔTi for obtaining the actual data Li are made irregular.

Figure 15:
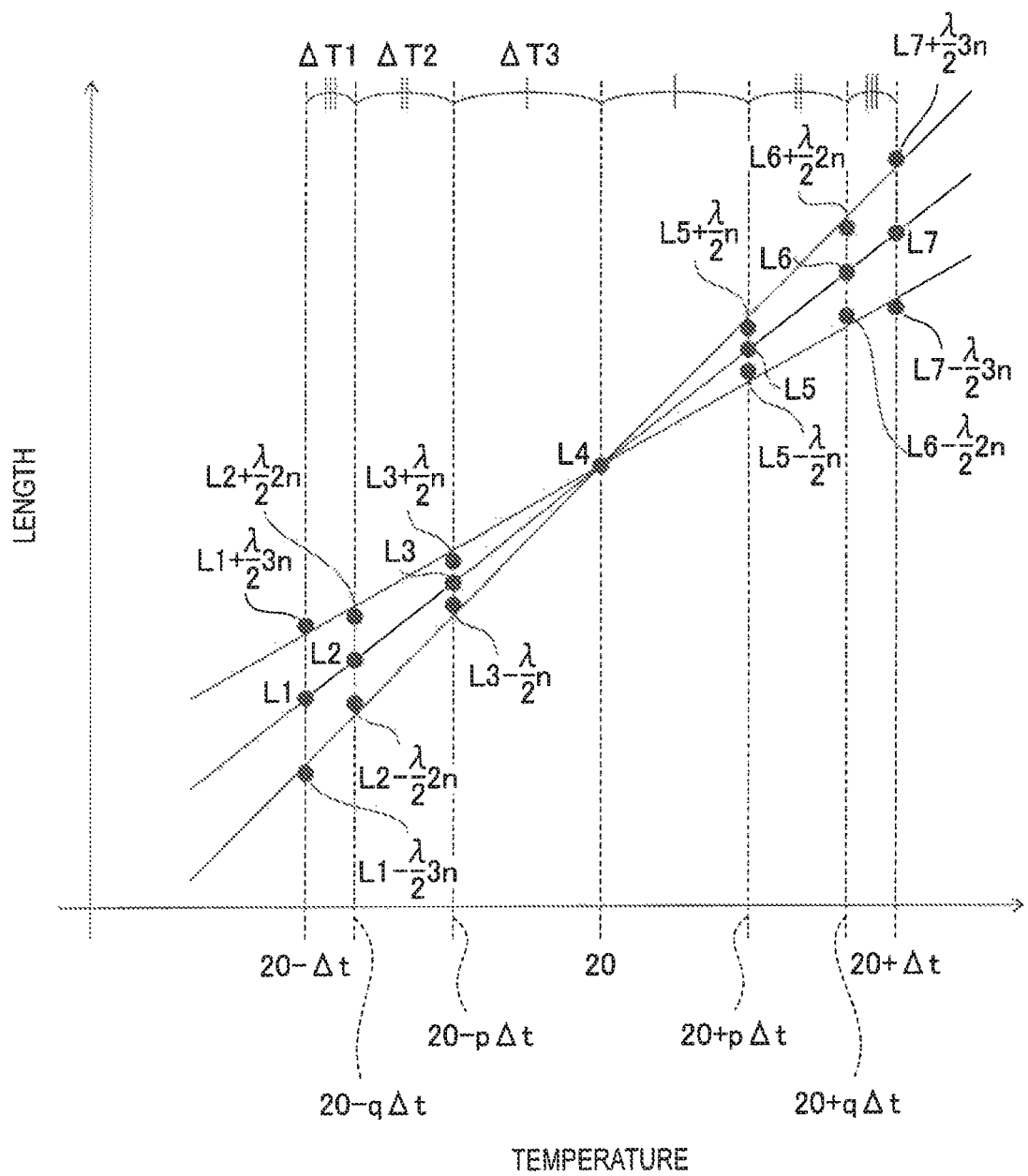
FIG. 15 is an example of a data set generated based on obtained actual data according to a third exemplary embodiment.

FIG. 15 is an example of a data set generated based on the actual data Li obtained according to the third exemplary embodiment. It is assumed that the data set A, which contains the verification data Di corresponding to the actual data Li having the order of interference N without an error, provides the correct CTE as in FIG. 12.

According to the third exemplary embodiment, in measuring the actual data Li of the object W at each of the temperatures Ti in Step S1, the temperature intervals ΔTi for the temperatures Ti are made irregular. Such irregular intervals may be determined as desired. In the example shown in FIG. 15, the temperature is changed such that the temperature intervals ΔTi are made symmetric with respect to 20 degrees C. However, only one of the temperature intervals ΔTi may be differentiated from the others or all the temperature intervals ΔTi may be differentiated from one another. Further, differentiating two or more of the temperature intervals ΔTi is more preferable than differentiating one of the temperature intervals, and differentiating all the temperature intervals ΔTi is further preferable.

Figure 16:
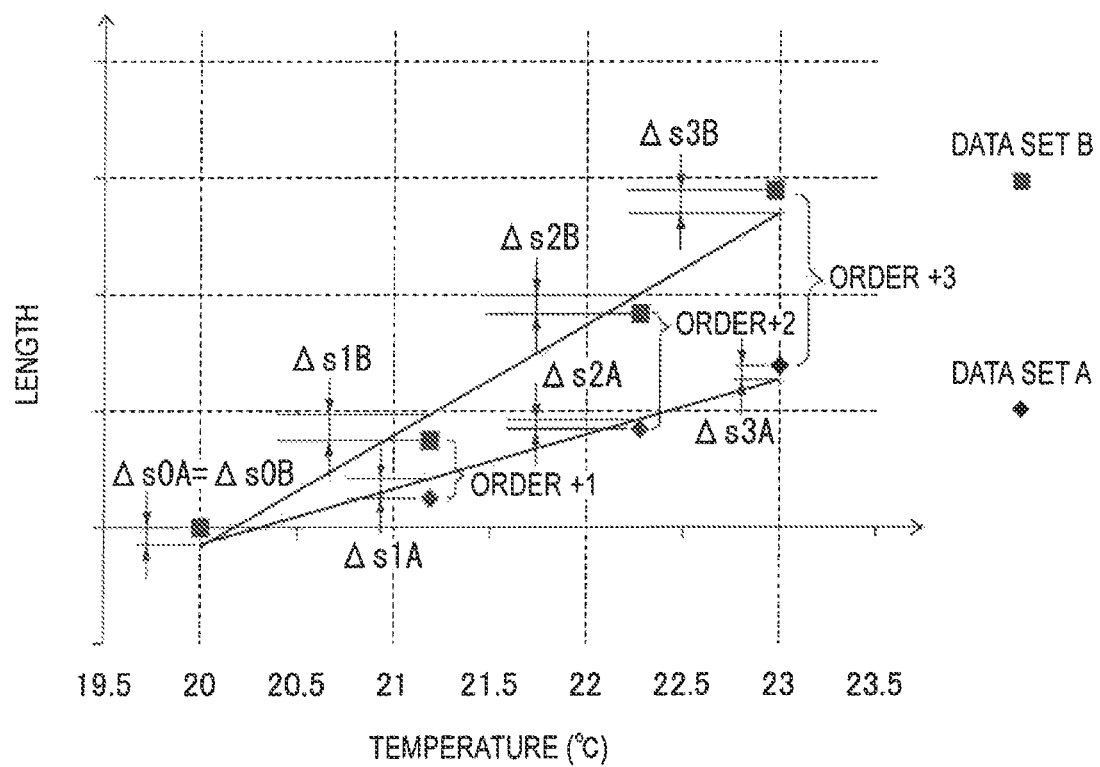
FIG. 16 shows the verification data and the linear approximation function of each of data sets A, B in FIG. 15 on an enlarged scale.
Figure 17:
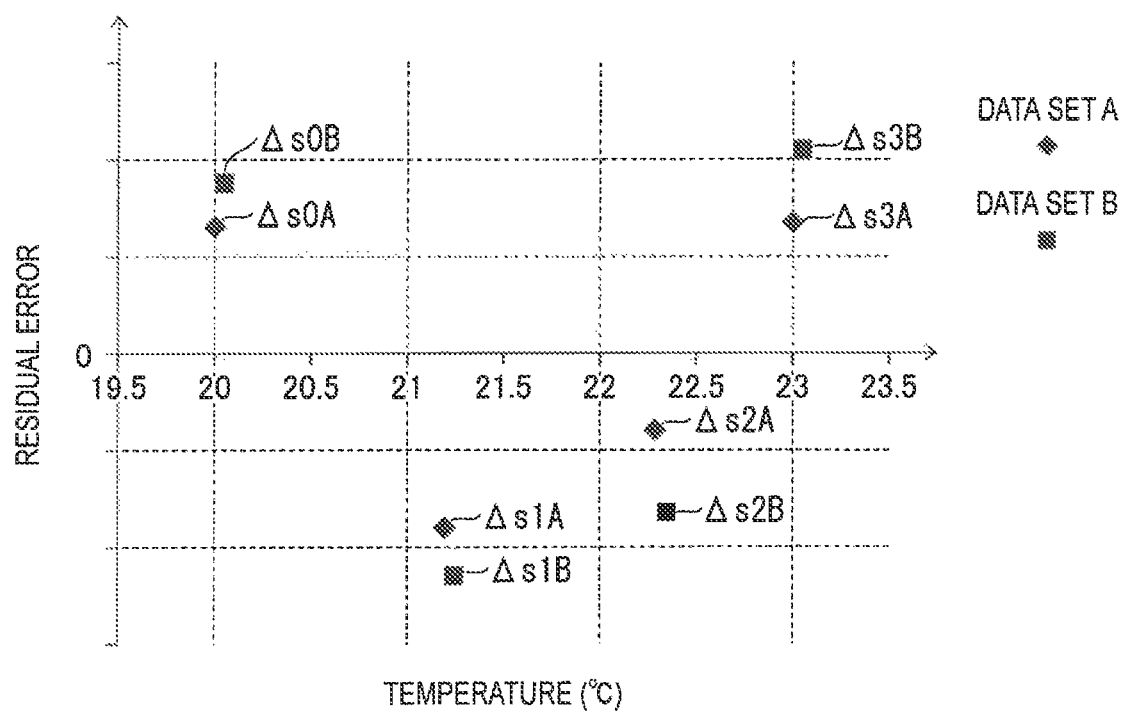
FIG. 17 shows residual errors in the data sets A, B in FIG. 15.
Figure 18:
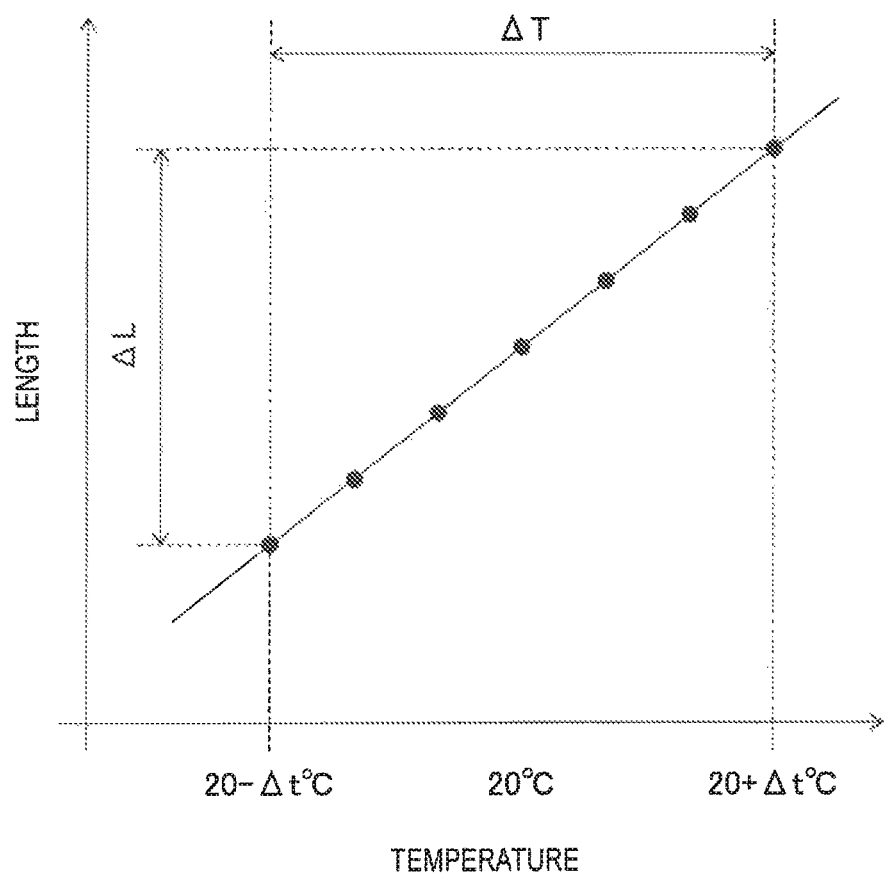
FIG. 18 shows an exemplary actual data set obtainable when orders of interference are correct.
Figure 19:
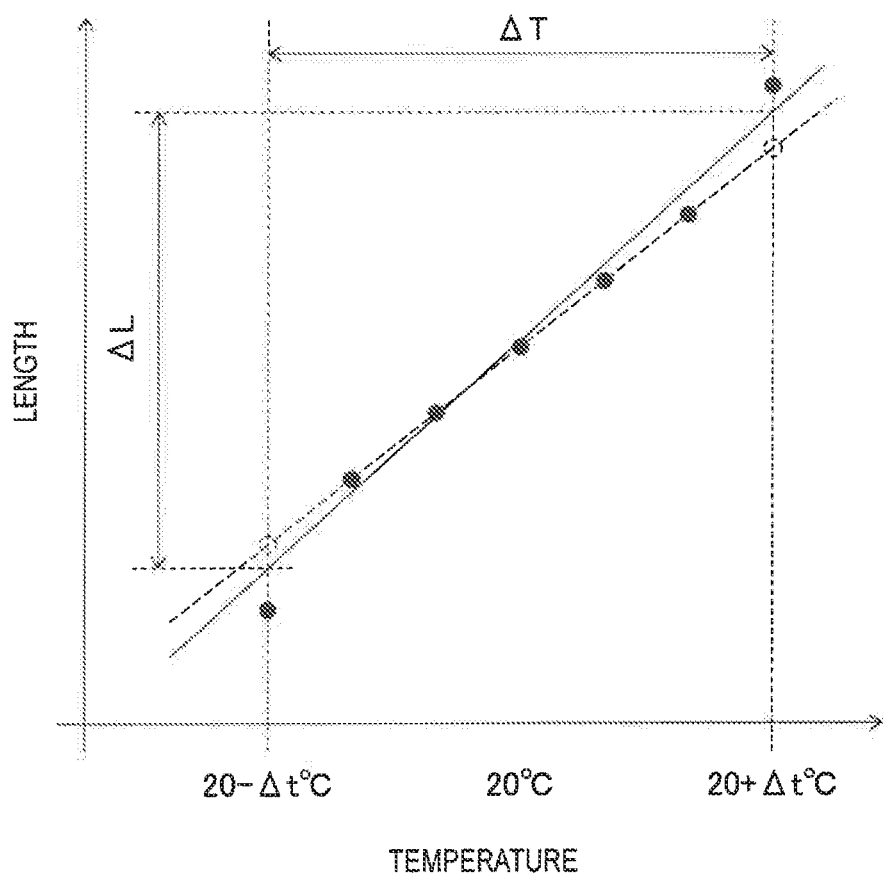
FIG. 19 shows an exemplary actual data set obtainable when the orders of interference are partly incorrectly determined.

FIG. 16 shows a part of each of the data sets A, B in FIG. 15 (a part at temperatures higher than 20 degrees C.) on an enlarged scale. FIG. 17 shows the residual errors Δs in FIG. 16.

As shown in FIG. 15, the data set B contains verification data D4 with the same order of interference as that of the data set A at 20 degrees C. Further, the data set B contains the pieces of verification data D5 to D7 with the orders of interference N being increased in increments of 1 at temperatures higher than 20 degrees C.

In this exemplary embodiment, the temperature intervals are irregular as shown in FIG. 15, so that the set temperatures are not proportional to the resulting order variations. Thus, the residual errors Δs of the data set A are different from those of the data set B as shown in FIG. 16.

This prevents two or more of the data sets from being selected as the first candidate data set, thus stabilizing the process. Further, the correct data set can be identified as the first candidate data set, thus allowing highly accurate calculation of the CTE α.

The third exemplary embodiment is explained above through the example using the linear approximation function but the same explanation is applicable to any example using a polynomial approximation function with two or more orders.

Modification(s)

Incidentally, it should be understood that the scope of the invention is not limited to the above-described exemplary embodiment(s) but includes any modifications and improvements not hampering the achievement of an object of the invention.

For instance, the CTE α is calculated based on the selected first candidate data set in the first exemplary embodiment. However, only the applicability of the actual data Li may be judged. For instance, if there is a data set having the evaluation index value s smaller than the evaluation index value s of a data set (actual data set) containing all the pieces of actual data Li, the actual data Li may be determined to include a piece of data with the incorrectly determined order of interference N and a display for urging remeasurement of actual data may appear on the display 41.

In the first exemplary embodiment, the CTE α is calculated based on each of all the data sets in Step S4, but the invention is not limited thereto. For instance, if the data set(s) with the CTE α out of the first acceptable range is not excluded in Step S7, only the approximation function(s) may be calculated without calculating the CTE α in Step S4. In this case, when the determination result is Yes in each of Step S8 and Step S9, only the CTE α based on the first candidate data may be calculated.

Alternatively, in the first exemplary embodiment, only the CTE α based on each of the data sets may be calculated without calculating the approximation function(s) in Step S4. In this case, it may be determined whether the calculated CTE α falls within the first acceptable range so that the approximation function(s) is calculated based on only the data set(s) having the CTE α within the first acceptable range.

In ranking the data sets in Step S7, as long as the first candidate data set and the second candidate data set are selected, it is not necessary to rank the other data sets. Further, if the applicability is not judged based on a difference between the evaluation index value s of the first candidate data set and the evaluation index value s of the second candidate data set in Step S9, only the first candidate data set is required to be selected. In other words, only the candidate data set with the smallest evaluation index value s is required to be selected from the verification data set group, so that it is not necessary to rank the other data sets.

In the above exemplary embodiments, the order of interference N is changed in the range of ±n in the process of the data set generating unit 443 for generating the verification data Di, but the invention is not limited thereto. For instance, the order of interference N may be changed in a range from −n1 to +n2 (n1≠n2).

In the first exemplary embodiment, the CTE α calculated with reference to the linear approximation function is exemplarily outputted as the CTE α of the object W in Step S10, but the CTE α calculated with reference to, for instance, the quadratic approximation function may be used instead as described above.

Alternatively, the first evaluation index value s1 determined for the linear approximation function and the second evaluation index value s2 determined for the quadratic approximation function may be compared so that the CTE α is calculated with reference to one of these approximation function with the smaller value. For instance, the CTE α is calculated from the gradient of the tangent of the quadratic approximation function at the reference temperature when s1>s2, whereas the CTE α is calculated from the gradient of the linear approximation function when s1<s2.

In the second exemplary embodiment, the actual data Lf is exemplarily always used as the verification data Df at the regular temperature Tf without changing the order of interference N of the actual data Lf. In the third exemplary embodiment, the temperature is exemplarily changed at the irregular intervals ΔTi. Instead of the above, the actual data Lf may be always used as the verification data Df at the predetermined regular temperature Tf as in the second exemplary embodiment and, further, the temperatures Ti may be changed at the irregular temperature intervals ΔTi.

What is claimed is:

1. A coefficient-of-thermal-expansion measuring device comprising:
   a temperature detector configured to detect a temperature of an object;
   an optical interferometer configured to measure a length of the object using a light of a single-wavelength λ;
   an actual data acquiring unit configured to: sequentially change the temperature of the object to temperatures Ti in a range of i=1 to k; and acquire actual data Li of the length of the object measured by the optical interferometer at each of the temperatures Ti;
   a data set generating unit configured to:
   change an order of interference N used in measuring the actual data Li at each of the temperatures Ti in the range of i=1 to k within a predetermined range to define temporary orders of interference N+n';
   generate a plurality of pieces of verification data Di corresponding to each of the temporary orders of interference N+n' by a formula Di=Li+n'λ/2, wherein
   a group, which is defined by selecting one of the pieces of verification data Di generated at each of the temperatures Ti in the range of i=1 to k, is defined as a data set (D1, D2, D3, . . . Di, . . . Dk) for each of i=1 to k, and
   a plurality of data sets are generated so that the verification data contained in each group becomes different;
   a judging unit configured to:
   derive a plurality of approximation functions with different orders from each of the plurality of data sets;
   calculate respective differences of the pieces of verification data Di in the range of i=1 to k in each of data sets from each of the approximation functions;
   calculate an evaluation index value in a form of a representative value of each of the differences for each of the approximate functions;
   select, as a candidate data set, a first data set with a smallest evaluation index value among the plurality of data sets for each of the approximation functions; and
   determine that the candidate data set is applicable when the candidate data set is the same for each of the approximation functions; and
   a coefficient-of-thermal-expansion calculator configured to calculate a coefficient of thermal expansion of the object by dividing a gradient ΔL/ΔT of one of the approximation functions of a predetermined order based on the candidate data set determined to be applicable by the judging unit at a predetermined reference temperature by the verification data Di at the reference temperature.

2. The coefficient-of-thermal-expansion measuring device according to claim 1, wherein
   the judging unit is configured to exclude any of the data sets that provides the coefficient of thermal expansion out of a predetermined first acceptable range.

3. The coefficient-of-thermal-expansion measuring device according to claim 1, wherein
   the judging unit is configured to determine whether the smallest evaluation index value of the first data set falls within a predetermined second acceptable range.

4. The coefficient-of-thermal-expansion measuring device according to claim 1, wherein
   the judging unit is configured to determine whether a difference between the smallest evaluation index value of the first data set and a second smallest evaluation index value of a second data set among the data sets is at least a predetermined value.

5. The coefficient-of-thermal-expansion measuring device according to claim 1, further comprising an order range acquiring unit configured to acquire the range of the order of interference, wherein
   the data set generating unit is configured to generate the verification data Di by setting the temporary order of interferences N+n' within the range of the order of interference acquired by the order range acquiring unit.

6. The coefficient-of-thermal-expansion measuring device according to claim 1, wherein the actual data Li comprises actual data Lf at a predetermined temperature Tf, and the data set generating unit is configured to calculate verification data Df for the actual data Lf by fixing the order of interference of the actual data Lf and to calculate the verification data Di for the rest of the actual data Li by setting the order of interference within the predetermined range.

7. The coefficient-of-thermal-expansion measuring device according to claim 1, wherein the actual data acquiring unit is configured to acquire the actual data Li resulting from changing temperature variations of the temperature of the object at irregular intervals.

8. A coefficient-of-thermal-expansion measurement method for measuring a coefficient of thermal expansion of an object, the method comprising:

sequentially changing a temperature of the object to temperatures Ti in a range of i=1 to k;

acquiring actual data Li of a length of the object measured at each of the temperatures Ti using an optical interferometer configured to emit a light of a single-wavelength $\lambda$;

changing an order of interference N used in measuring the pieces of actual data Li at the temperatures Ti in the range of i=1 to k within a predetermined range to define temporary orders of interference N+n';

generating a plurality of pieces of verification data Di corresponding to each of the temporary orders of interference N+n' by a formula Di=Li+n'$\lambda$/2, wherein a group, which is defined by selecting one of the pieces of verification data Di generated at each of the temperatures Ti in the range of i=1 to k, is defined as a data set (D1, D2, D3, ... Di, ... Dk) for each of i=1 to k, and a plurality of data sets are generated so that the verification data contained in each group becomes different;

deriving a plurality of approximation functions with different orders from each of the plurality of data sets;

calculating differences of the pieces of verification data Di included in each of the data sets in the range of i=1 to k from each of the approximation functions;

determining an evaluation index value in a form of a representative value of the respective differences;

selecting one of the pieces of data sets with a smallest evaluation index value as a candidate data set among the plurality of data sets for each of the approximation functions;

determining that the candidate data set is applicable when the candidate data set is the same for each of the approximation functions; and calculating a coefficient of thermal expansion of the object by dividing a gradient $\Delta L/\Delta T$ of one of the approximation functions of a predetermined order based on the candidate data set determined to be applicable at a predetermined reference temperature by the verification data Di at the reference temperature.

* * * * *